(12) United States Patent
Brandt et al.

(10) Patent No.: US 7,931,197 B2
(45) Date of Patent: Apr. 26, 2011

(54) RFID-BASED PRODUCT MANUFACTURING AND LIFECYCLE MANAGEMENT

(75) Inventors: David D. Brandt, Milwaukee, WI (US); Ramdas M. Pai, Racine, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 1096 days.

(21) Appl. No.: 11/230,758

(22) Filed: Sep. 20, 2005

(65) Prior Publication Data
US 2007/0063029 A1    Mar. 22, 2007

(51) Int. Cl.
*G06F 19/00* (2006.01)
(52) U.S. Cl. .................. 235/385; 235/380
(58) Field of Classification Search .......... 235/385, 235/383, 462.13, 462.46, 380
See application file for complete search history.

(56) References Cited

U.S. PATENT DOCUMENTS

| | | |
|---|---|---|
| 3,858,212 A | 12/1974 | Tompkins et al. |
| 4,949,299 A | 8/1990 | Pickett et al. |
| 5,300,875 A | 4/1994 | Tuttle |
| 5,461,666 A | 10/1995 | McMahan et al. |
| 5,613,228 A | 3/1997 | Tuttle et al. |
| 5,621,199 A | 4/1997 | Calari et al. |
| 5,629,981 A | 5/1997 | Nerlikar |
| 5,689,415 A | 11/1997 | Calotychos et al. |
| 5,701,127 A | 12/1997 | Sharpe |
| 5,703,347 A | 12/1997 | Reddersen et al. |
| 5,785,181 A | 7/1998 | Quartararo, Jr. |
| 5,798,693 A | 8/1998 | Engellenner |
| 5,822,714 A | 10/1998 | Cato |
| 5,874,724 A | 2/1999 | Cato |
| 5,874,896 A | 2/1999 | Lowe et al. |
| 5,905,249 A | 5/1999 | Reddersen et al. |
| 5,910,776 A | 6/1999 | Black |
| 5,949,335 A | 9/1999 | Maynard |
| 5,952,935 A | 9/1999 | Mejia et al. |
| 5,963,134 A | 10/1999 | Bowers et al. |
| 5,964,656 A | 10/1999 | Lawler, Jr. et al. |
| 5,971,587 A | 10/1999 | Kato et al. |
| 5,973,600 A | 10/1999 | Mosher, Jr. |

(Continued)

FOREIGN PATENT DOCUMENTS

CN    1426546 A  *  6/2003

(Continued)

OTHER PUBLICATIONS

European Search Report dated Feb. 6, 2006 mailed Feb. 20, 2006 for European Patent Application Serial No. 10/985,173, 3 Pages.

(Continued)

*Primary Examiner* — Daniel St.Cyr
(74) *Attorney, Agent, or Firm* — Turocy & Watson LLP; William R. Walbrun; John M. Miller

(57) ABSTRACT

Architecture that utilizes RFID technology in product manufacturing and lifecycle management to track the depletion of inventory, verify the correctness of a part, monitor the completeness of an assembled product, and check a returned product to determine warranty procedure. An RFID reader, or reader/writer, can sense information of an RFID tag associated with an item at various stages of product life. The information can be compared with data associated with the RFID-tagged item, and appropriate action can be taken based on the comparison. A machine learning and reasoning component can be utilized to generate automatic action based on the information.

32 Claims, 13 Drawing Sheets

U.S. PATENT DOCUMENTS

| | | |
|---|---|---|
| 5,983,200 A * | 11/1999 | Slotznick .................... 705/28 |
| 5,992,096 A | 11/1999 | De La Cerda et al. |
| 6,049,745 A | 4/2000 | Douglas et al. |
| 6,091,998 A | 7/2000 | Vasko et al. |
| 6,115,616 A | 9/2000 | Halperin et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 | 1/2001 | Ghaffari et al. |
| 6,170,059 B1 | 1/2001 | Pruett et al. |
| 6,172,609 B1 | 1/2001 | Lu et al. |
| 6,205,362 B1 | 3/2001 | Eidson |
| 6,211,789 B1 | 4/2001 | Oldham et al. |
| 6,232,407 B1 | 5/2001 | Hashidzume et al. |
| 6,263,440 B1 | 7/2001 | Pruett et al. |
| 6,264,106 B1 | 7/2001 | Bridgelall |
| 6,265,976 B1 | 7/2001 | Roesner |
| 6,272,321 B1 | 8/2001 | Bruhnke et al. |
| 6,275,681 B1 | 8/2001 | Vega et al. |
| 6,282,455 B1 | 8/2001 | Engdahl |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,297,734 B1 | 10/2001 | Richardson et al. |
| 6,305,548 B1 | 10/2001 | Sato et al. |
| 6,307,517 B1 | 10/2001 | Lee |
| 6,317,027 B1 | 11/2001 | Watkins |
| 6,318,636 B1 | 11/2001 | Reynolds et al. |
| 6,330,971 B1 | 12/2001 | Mabry et al. |
| 6,342,839 B1 | 1/2002 | Curkendall et al. |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,377,764 B1 | 4/2002 | Morris-jones |
| 6,392,544 B1 | 5/2002 | Collins et al. |
| 6,400,272 B1 | 6/2002 | Holtzman et al. |
| 6,400,372 B1 | 6/2002 | Gossweiler, III et al. |
| 6,401,936 B1 | 6/2002 | Isaacs et al. |
| 6,409,401 B1 | 6/2002 | Petteruti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney et al. |
| 6,448,886 B2 | 9/2002 | Garber et al. |
| 6,451,154 B1 | 9/2002 | Grabau et al. |
| 6,476,708 B1 | 11/2002 | Johnson |
| 6,480,100 B1 | 11/2002 | Frieden et al. |
| 6,484,886 B1 | 11/2002 | Isaacs et al. |
| 6,486,780 B1 | 11/2002 | Garber et al. |
| 6,501,382 B1 | 12/2002 | Rehfus et al. |
| 6,505,780 B1 | 1/2003 | Yassin et al. |
| 6,517,000 B1 | 2/2003 | McAllister et al. |
| 6,523,752 B2 | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda et al. |
| 6,587,856 B1 | 7/2003 | Srinivasan et al. |
| 6,593,853 B1 | 7/2003 | Barrett et al. |
| 6,600,418 B2 | 7/2003 | Sainati et al. |
| 6,607,123 B1 | 8/2003 | Jollifee et al. |
| 6,608,551 B1 | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 | 1/2004 | Landt |
| 6,687,293 B1 | 2/2004 | Loyer et al. |
| 6,693,539 B2 | 2/2004 | Bowers et al. |
| 6,700,533 B1 | 3/2004 | Werb et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lazo et al. |
| 6,793,127 B2 | 9/2004 | Alsafadi et al. |
| 6,802,659 B2 | 10/2004 | Cremon et al. |
| 6,808,116 B1 | 10/2004 | Eslambolchi et al. |
| 6,809,646 B1 | 10/2004 | Lee |
| 6,812,824 B1 | 11/2004 | Goldinger et al. |
| 6,812,838 B1 | 11/2004 | Maloney |
| 6,816,817 B1 | 11/2004 | Retlich et al. |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 | 2/2005 | Muehl et al. |
| 6,870,797 B2 | 3/2005 | Reasoner et al. |
| 6,873,260 B2 | 3/2005 | Lancos et al. |
| 6,878,896 B2 | 4/2005 | Esslinger et al. |
| 6,879,809 B1 | 4/2005 | Vega et al. |
| 6,888,459 B2 | 5/2005 | Stilp |
| 6,897,763 B2 | 5/2005 | Schulmerich et al. |
| 6,899,476 B1 | 5/2005 | Barrus et al. |
| 6,901,304 B2 | 5/2005 | Swan et al. |
| 6,903,656 B1 | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,935,560 B2 | 8/2005 | Andreasson et al. |
| 6,940,408 B2 | 9/2005 | Ferguson et al. |
| 6,943,678 B2 | 9/2005 | Muirhead |
| 6,943,688 B2 | 9/2005 | Chung et al. |
| 6,967,579 B1 | 11/2005 | Elizondo |
| 6,975,229 B2 | 12/2005 | Carrender |
| 6,992,574 B2 | 1/2006 | Aupperle et al. |
| 6,999,955 B1 | 2/2006 | Horvitz |
| 7,023,342 B2 | 4/2006 | Corbett et al. |
| 7,036,729 B2 | 5/2006 | Chung |
| 7,057,509 B2 | 6/2006 | Gualdi et al. |
| 7,061,379 B2 | 6/2006 | Chen et al. |
| 7,066,388 B2 | 6/2006 | He |
| 7,066,667 B2 | 6/2006 | Chapman et al. |
| 7,066,687 B2 | 6/2006 | Martin et al. |
| 7,069,100 B2 | 6/2006 | Monette et al. |
| 7,073,712 B2 | 7/2006 | Jusas et al. |
| 7,075,412 B1 | 7/2006 | Reynolds et al. |
| 7,079,023 B2 | 7/2006 | Haller |
| 7,084,769 B2 | 8/2006 | Bauer et al. |
| 7,114,655 B2 | 10/2006 | Chapman et al. |
| 7,127,507 B1 | 10/2006 | Clark et al. |
| 7,135,976 B2 | 11/2006 | Neff et al. |
| 7,151,456 B2 | 12/2006 | Godfrey |
| 7,165,722 B2 | 1/2007 | Shafer et al. |
| 7,183,922 B2 | 2/2007 | Mendolia et al. |
| 7,187,288 B2 | 3/2007 | Mendolia et al. |
| 7,194,072 B2 | 3/2007 | Gamble |
| 7,195,159 B2 | 3/2007 | Sloan et al. |
| 7,212,637 B2 | 5/2007 | Salisbury |
| 7,221,258 B2 | 5/2007 | Lane et al. |
| 7,230,730 B2 | 6/2007 | Owen et al. |
| 7,240,027 B2 * | 7/2007 | McConnell et al. ............ 705/28 |
| 7,272,502 B2 | 9/2007 | Lee et al. |
| 7,336,153 B2 | 2/2008 | Malone et al. |

| | | |
|---|---|---|
| 7,336,167 B2 | 2/2008 | Olsen, III et al. |
| 7,336,243 B2 | 2/2008 | Jo et al. |
| 7,339,476 B2 | 3/2008 | Macurek et al. |
| 7,373,087 B2 | 5/2008 | Shi et al. |
| 7,388,491 B2 | 6/2008 | Chand et al. |
| 7,389,921 B2 | 6/2008 | Lin et al. |
| 7,486,181 B2 | 2/2009 | Olsen et al. |
| 7,510,110 B2 | 3/2009 | Pietrzyk et al. |
| 7,520,429 B2 | 4/2009 | Koster |
| 2001/0000019 A1 | 3/2001 | Bowers et al. |
| 2001/0008390 A1 | 7/2001 | Berquist et al. |
| 2001/0015760 A1 | 8/2001 | Fellegara et al. |
| 2002/0005774 A1 | 1/2002 | Rudolph et al. |
| 2002/0067265 A1 | 6/2002 | Rudolph |
| 2002/0070862 A1 | 6/2002 | Francis et al. |
| 2002/0130778 A1 | 9/2002 | Nicholson |
| 2002/0143320 A1 | 10/2002 | Levin |
| 2002/0155843 A1 | 10/2002 | Bahl et al. |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0007473 A1 | 1/2003 | Strong et al. |
| 2003/0023337 A1 | 1/2003 | Godfrey et al. |
| 2003/0071731 A1 | 4/2003 | Jesme |
| 2003/0102367 A1 | 6/2003 | Monette et al. |
| 2003/0109951 A1 | 6/2003 | Hsiung et al. |
| 2003/0126103 A1* | 7/2003 | Chen et al. ............. 706/50 |
| 2003/0150908 A1 | 8/2003 | Pokorny et al. |
| 2003/0169149 A1 | 9/2003 | Ohki et al. |
| 2003/0203730 A1 | 10/2003 | Wan et al. |
| 2003/0210142 A1 | 11/2003 | Freathy et al. |
| 2003/0216969 A1* | 11/2003 | Bauer et al. ............. 705/22 |
| 2003/0225635 A1* | 12/2003 | Renz et al. ............. 705/28 |
| 2004/0008123 A1 | 1/2004 | Carrender et al. |
| 2004/0024644 A1 | 2/2004 | Gui et al. |
| 2004/0032443 A1 | 2/2004 | Moylan et al. |
| 2004/0046642 A1 | 3/2004 | Becker et al. |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunes et al. |
| 2004/0084526 A1* | 5/2004 | Knowles et al. ............. 235/385 |
| 2004/0095910 A1 | 5/2004 | Metts et al. |
| 2004/0108378 A1 | 6/2004 | Gatz |
| 2004/0124988 A1 | 7/2004 | Leonard et al. |
| 2004/0160324 A1 | 8/2004 | Stilp |
| 2004/0181467 A1* | 9/2004 | Raiyani et al. ............. 705/28 |
| 2004/0189443 A1 | 9/2004 | Eastburn |
| 2004/0220960 A1 | 11/2004 | Ojeil et al. |
| 2005/0012613 A1 | 1/2005 | Eckstein et al. |
| 2005/0021369 A1 | 1/2005 | Cohen et al. |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0062603 A1 | 3/2005 | Fuerst et al. |
| 2005/0068179 A1 | 3/2005 | Roesner |
| 2005/0083180 A1 | 4/2005 | Horwitz et al. |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0093703 A1 | 5/2005 | Twitchell |
| 2005/0099268 A1 | 5/2005 | Juels et al. |
| 2005/0110641 A1 | 5/2005 | Mendolia et al. |
| 2005/0135181 A1 | 6/2005 | Shionoiri et al. |
| 2005/0140511 A1 | 6/2005 | Bonnell et al. |
| 2005/0143026 A1 | 6/2005 | Bellantoni |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0177466 A1 | 8/2005 | Willins |
| 2005/0179521 A1 | 8/2005 | Pillai et al. |
| 2005/0180566 A1 | 8/2005 | Ryal |
| 2005/0188095 A1 | 8/2005 | Gardiner et al. |
| 2005/0190098 A1 | 9/2005 | Bridgelall et al. |
| 2005/0192727 A1 | 9/2005 | Shostak et al. |
| 2005/0197775 A1 | 9/2005 | Smith |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Allen |
| 2005/0228528 A1 | 10/2005 | Farchmin et al. |
| 2005/0237162 A1 | 10/2005 | Hyde et al. |
| 2005/0240305 A1 | 10/2005 | Bogash et al. |
| 2005/0241548 A1 | 11/2005 | Muirhead |
| 2005/0253717 A1 | 11/2005 | Howarth et al. |
| 2005/0253718 A1 | 11/2005 | Droms et al. |
| 2005/0258955 A1 | 11/2005 | Gloekler et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0049250 A1 | 3/2006 | Sullivan |
| 2006/0053234 A1 | 3/2006 | Kumar et al. |
| 2006/0055508 A1 | 3/2006 | Kumar et al. |
| 2006/0060657 A1 | 3/2006 | Choong et al. |
| 2006/0071774 A1 | 4/2006 | Brown et al. |
| 2006/0108411 A1 | 5/2006 | Macurek et al. |
| 2006/0125653 A1 | 6/2006 | McQuade |
| 2006/0125694 A1 | 6/2006 | Dejanovic et al. |
| 2006/0145850 A1 | 7/2006 | Krstulich |
| 2006/0170565 A1 | 8/2006 | Husak et al. |
| 2006/0200256 A1 | 9/2006 | Mason et al. |
| 2006/0208859 A1 | 9/2006 | Hougen et al. |
| 2006/0232382 A1 | 10/2006 | Bauer et al. |
| 2006/0250248 A1 | 11/2006 | Tu et al. |
| 2006/0279412 A1 | 12/2006 | Holland et al. |
| 2007/0008073 A1 | 1/2007 | Poasevara |
| 2007/0013517 A1 | 1/2007 | Posamentier |
| 2007/0013519 A1 | 1/2007 | Chung et al. |
| 2007/0035396 A1 | 2/2007 | Chand et al. |
| 2007/0040681 A1 | 2/2007 | Jessup |
| 2007/0063029 A1 | 3/2007 | Brandt et al. |
| 2007/0137531 A1 | 6/2007 | Muirhead |
| 2007/0159311 A1 | 7/2007 | Schober |
| 2007/0159331 A1 | 7/2007 | Zegelin |
| 2007/0205860 A1 | 9/2007 | Jones et al. |
| 2007/0205861 A1 | 9/2007 | Nair et al. |

FOREIGN PATENT DOCUMENTS

| | | |
|---|---|---|
| DE | 10314260 A1 | 10/2004 |
| EP | 1542105 A | 6/2005 |
| WO | 0016289 | 3/2000 |
| WO | 0058752 | 10/2000 |
| WO | 0169516 | 9/2001 |
| WO | 01/82009 A2 * | 11/2001 |
| WO | 02073523 | 9/2002 |
| WO | 02/101670 A2 | 12/2002 |
| WO | 03056403 A | 7/2003 |
| WO | 03056469 A | 7/2003 |
| WO | 2005045743 A | 5/2005 |
| WO | 2007/030544 A3 | 3/2007 |

OTHER PUBLICATIONS

M. Karkkainen, et al.: "The product centric approach: a solution to supply network information management problems?" Computers in Industry, Elsevier Science Publishers. Amsterdam, NL, vol. 52, No. 2, Oct. 2003 .
European Search Report dated Feb. 14, 2006 mailed Feb. 20, 2006 for European Patent Application Serial No. 10/985,621, 3 Pages.
International Search Report for PCT Application Serial No. PCT/US06/34290, mailed Feb. 5, 2008, 2 pages.
OA Dated Apr. 21, 2009 for U.S. Appl. No. 11/190,143, 19 pages.
International Search Report for PCT Application Serial No. PCT/US06/34290, mailed Feb. 5, 2008, 2 pages.
OA Dated Aug. 8, 2008 for U.S. Appl. No. 11/241,421, 49 pages.
OA Dated Aug. 28, 2008 for U.S. Appl. No. 11/129,199, 28 pages.

OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
OA Dated Jan. 30, 2009 for U.S. Appl. No. 11/129,199, 32 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Mar. 26, 2009 for U.S. Appl. No. 11/200,915, 70 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application Serial No. PCT/US06/34721 mailed Apr. 26, 2007, 1 page.
CN OA Dispatched Jul. 4, 2008 for Chinese Application No. 200610141407.1, 12 pages.
EP OA dated Mar. 19, 2009 for European Patent Application No. 05 776 159.5, 3 pages.
EP OA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages.
OA dated May 14, 2009 for U.S. Appl. No. 11/239,959, 37 pages.
CNOA due Apr. 1, 2008 for Chinese Patent Application No. 200510137387.6, 21 pages.*
OA dated Jan. 7, 2010 for U.S. Appl. No. 12/040,305, 78 pages.*
European Search Report dated Nov. 20, 2009 for European Patent Application No. EP 06 80 3042, 7 pages.*
OA dated Dec. 24, 2009 for U.S. Appl. No. 12/140,118, 76 pages.*
OA dated Jan. 27, 2010 for U.S. Appl. No. 11/185,114, 88 pages.*
OA dated Jan. 13, 2010 for U.S. Appl. No. 12/263,750, 16 pages.
OA dated Mar. 1, 2010 for U.S. Appl. No. 11/239,959, 29 pages.
OA dated Aug. 21, 2009 for U.S. Appl. No. 11/239,959, 34 pages.
OA Dated Jul. 28, 2009 for U.S. Appl. No. 11/220,130, 32 pages.
OA dated Jul. 30, 2009 for U.S. Appl. No. 12/263,750, 65 pages.
OA Dated Aug. 26, 2009 for U.S. Appl. No. 11/241,421, 24 pages.
OA dated Sep. 21, 2009 for U.S. Appl. No. 11/190,143, 27 pages.
OA dated Oct. 8, 2009 for U.S. Appl. No. 11/200,915, 41 pages.
OA Dated Aug. 8, 2008 for U.S. Appl. No. 11/241,421, 49 pages.
OA Dated Aug. 28, 2008 for U.S. Appl. No. 11/129,199, 28 pages.
OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
International Search Report for PCT Application No. PCT/US06/34290, mailed Feb. 5, 2008, 2 pages.

* cited by examiner

RFID-BASED PRODUCT MANUFACTURING AND LIFECYCLE MANAGEMENT

TECHNICAL FIELD

The subject invention relates to industrial control systems and, more particularly, to systems and methods that employ radio frequency identification (RFID) technology in connection with product manufacturing and lifecycle management.

BACKGROUND OF THE INVENTION

In business environments, and in particular manufacturing environments such as the automotive industry, parts are often delivered in racks, or on pallets, or on skids. Upon receipt of the delivered parts, the parts assembled into completed products.

Radio frequency identification (RFID) is an emerging technology that leverages electronic data and wireless communication for identification purposes and can be utilized with systems from secure Internet payment systems to industrial automation and access control systems. In particular, RFID is technology that facilitates automatic identification that enhances data handling processes and is complementary in many ways to other data capture technologies, such as bar coding. However, unlike other forms of data collection, such as bar coding and/or manual methods, RFID relieves employees from the repetitive, time-consuming and error-prone process of obtaining data from countless thousands of items. Thus, the benefits of utilization of RFID technology include reduced labor costs, simplified business processes, improved inventory control and increased sales.

A goal of an RFID system can be to carry data in suitable transponders, generally known as RFID tags, and to retrieve data by machine-readable means at any desired time and place to satisfy particular application needs.

Non-automated methods for replenishing parts in the product manufacturing process present multiple inefficiencies. Where the replenishment requests for product manufacturing parts is not responsive in real-time, the manufacturing process is inefficient. Such inefficiencies can lead to manufacturing slowdowns or even stoppages.

One solution to managing product manufacturing parts inventory replenishment is to have the parts delivery person visit the assembly location periodically and make note of what parts need replenishing. This solution requires extra travel for the parts delivery person, who must personally visit each product manufacturing facility individually in order to determine what parts need to be replenished. Additionally, there is the possibility that the inventory of parts can be exhausted at a time where the parts delivery person is not available, leading to either a slowdown or a stoppage of the product manufacturing facility. A way to fix this problem is to keep each product manufacturing facility stocked with extra inventory to assure constant operation, but this approach is inefficient and creates potential problems for sensitive or perishable inventory items.

Another solution to managing product manufacturing parts inventory replenishment is to have the assembler call for the parts that need to be replenished. This solution could be implemented by a networked call button that indicates when and where the parts need to be replenished. This solution obviates the need for the parts delivery person to visit each manufacturing facility individually, and allows for keeping parts inventories at minimal levels. However, this solution requires the attention and time of the assembler, which detracts from the assembler's primary function. The assembler's primary function is assembling the constituent parts into a partially or completely assembled product. It is possible that the assembler will not notice that the parts inventory level has dropped below a lower limit until it is too late to prevent a line stoppage. The application of wireless technology to this solution does not resolve the necessity of the assembler's attention to the parts inventory level.

Yet another solution to managing product manufacturing parts inventory replenishment is to create specialized racks that notice the presence of the parts by weight, light beam, or other methods. The exact local inventory is ascertained automatically, and when the local inventory drops below a lower limit, an automatic replenishment request can be generated. Accordingly, the inventory replenishment can be optimized. However, this solution is expensive to install because it requires specialized racks capable of sensing the presence of parts. Furthermore, this solution requires either special shipping containers capable of noticing the presence of the parts or a parts transfer step, where the parts are removed from the shipping containers and placed onto the special racks that notice the presence of the parts. Additionally, while this solution does track the number of parts in the inventory, it is not able to track more specific information associated with the parts in the inventory, such as part identification number, part type, date of part manufacture, part cost, part supplier information, part color, or part composition.

Accordingly, there exists a need for an automated solution to the problem of tracking the number of parts in an inventory while tracking specific information associated with those parts in real-time to maximize the efficiency of inventory replenishment as parts from the inventory are consumed in the manufacturing assembly process.

The RFID technology can further be employed to verify the correctness of an RFID tagged part that is to be incorporated into a partially assembled product in an industrial process. Use of RFID technology presents a significant improvement over the prior art of bar coding. Bar coding technology requires optical scanning of the bar code. Optical scanning of the bar code requires repositioning the bar code reader, the part, or the partially assembled product in order to verify the correctness of the part. Repositioning any of these elements of the assembly process requires redesigning the assembly system to accommodate the need for repositioning in order to perform an optical scan. Because the orientation of the RFID tagged part is irrelevant to the ability of an RFID reader to sense electronic information kept on the RFID tag, there is no need to redesign the assembly system. The longer range of RFID technology further allows one to incorporate RFID technology into existing assembly systems with little or no modification to the existing systems. The RFID reader need only be within the effective range of the RFID tags embedded in the RFID tagged parts in order to be effective. For example, an RFID reader could be housed in a small compartment in an area nearby to the assembly area, completely out of the way of the existing assembly system.

Use of RFID technology in the context of checking a completely assembled product for completeness presents significant advantages over the use of bar code technology. First, the bar codes must be optically scanned by a reader, which requires special positioning of either the completely assembled product or the reader itself. The need for special repositioning can interfere with an efficient assembly system, requiring special designs or modifications to accommodate an automated repositioning system. Second, the bar codes must be visually accessible to the reader. For a complicated completely assembled product with parts that are located in its interior, optical scanning can require either some disassembly to allow for optical access or at least some manipulation of the completely assembled product in order to achieve optical access.

For example, if the completely assembled product is an automobile, one must design a system that opens the hood of the automobile in order to optically scan parts under the hood. RFID technology can also be applied to determining the parts composition of products returned by consumers to a manufacturer or a representative. RFID technology presents numerous advantages over bar code technology in this context. First, bar code technology, requiring optical scanning, can require some disassembly of the returned product in order to read the bar code. The need for some disassembly creates a situation in which the manufacturer or representative can inadvertently damage the returned product, independently of any damage the consumer can have reported or caused. There is thus the potential for further damaging the returned product beyond repair, or damaging the returned product in a manner different from the damage that originally motivated the consumer to return the product. Second, bar codes must be located on the surface of the parts. Because of their location on the surface of parts, bar codes can be damaged by either normal wear and tear or alternatively by the consumer's removal of the bar code or defacement.

RFID technology presents solutions to the efficiency and durability problems faced by bar codes. RFID tags can be read without any disassembly of the returned product. The parts composition of the returned products can be read without even removing the returned product from the shipping container used to return the product from the consumer to the manufacturer or representative. With RFID tags, there is no need for human manipulation of the returned product, which minimizes the possibility that the returned product may be damaged in the inspection process. Furthermore, RFID tags need not be located on the surface of the parts. As such, RFID tags are not susceptible to surface damage by normal wear and tear. Additionally, RFID tags are more difficult to locate and disable by consumers than bar codes. Accordingly, the use of RFID technology in determining the parts composition of products returned by consumers to a manufacturer or a representative presents significant advantages over bar code technology.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to the use of radio frequency identification (RFID) technology in managing product manufacture and product lifecycle. Systems and/or methods that read, write, store, and analyze electronic information of RFID tags are provided. The utilization of RFID technology is applied to various stages of product life.

In one aspect thereof, inventory levels of RFID-tagged items can be managed during an operation based on information read from RFID tagged items. An RFID reader (or reader/writer) can sense information of the RFID tagged items and facilitate determination of whether a predetermined limit has been reached. If the predetermined limit has been reached, a replenishment request or trigger event can be generated, in response to which more items can be delivered to the operation site.

In another aspect of the subject invention, correctness of an RFID tagged part can be verified prior to the part's incorporation into a multipart product. An RFID reader (or reader/writer) senses information of the RFID tagged part before it is incorporated into the multipart product, and determines if the part is a required part or a proper choice among a set of options. If the part is correct, it is incorporated into the multipart product. If the part is incorrect, a removal component facilitates removal of the incorrect part.

In another aspect of the subject invention, completeness of a completely assembled product can be checked, and a parts manifest for the completed product that includes information associated with one or more RFID tagged parts can be generated. This can include software and hardware. An RFID reader (or reader/writer) scans the completely assembled product and determines the information associated with some or all of the RFID tagged parts included therein. The RFID reader can then facilitate compiling of the information into the parts manifest and storage for later access.

In another aspect thereof, the as-returned parts composition of a returned product can be determined based on an RFID read of the returned parts, compared to a valid composition of the product as delivered and, the warranty and repair policy and procedure can be determined based at least in part on the comparison results. The valid composition can be an as-built composition, or an as-built composition that allows for authorized modifications. If the as-returned composition does not match the valid composition, the returned product can be returned. Alternatively, if the as-returned composition does match the valid composition, the returned product can be repaired and/or replaced, for example.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
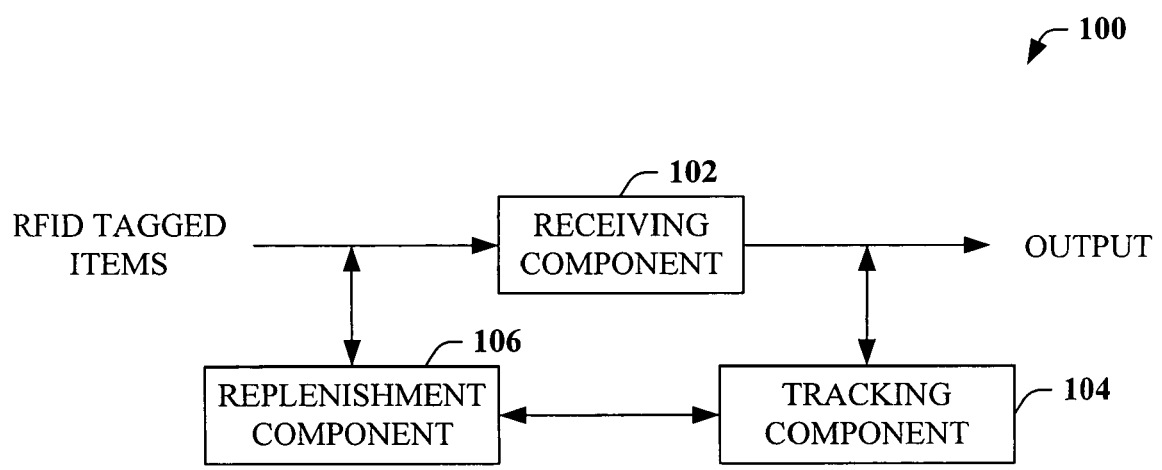
FIG. 1 illustrates an exemplary system that tracks consumption of RFID tagged items and replenishes the RFID tagged items, in accordance with an aspect of the subject matter.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention relates to architecture that utilizes radio frequency identification (RFID) tagged items in manufacturing processes. Additionally, RFID tagged items can be incorporated into assembled products and utilized for product lifecycle management. Systems and methods for replenishment of parts as they are expended at the assembly location, parts verification during assembly of a product, product completeness verification, product part manifest generation and storage, and validation of the composition of products returned by consumers are provided.

However, bar coding technology cannot provide the efficiency and functional advantages made possible by RFID technology. First, an RFID tag is readable at a farther distance than a bar code. Accordingly, an RFID reader/writer can sense, read, and write to RFID tags from further away than is possible with a method or system based on bar codes. Second, an RFID tag is much easier to read quickly and accurately. Thus, an RFID tag presents several advantages over bar codes. An RFID tagged part does not need to be reoriented in order to be scanned. An RFID tag is not vulnerable to smearing damage or marking out in the same manner as a bar code. An RFID tag is less visible and therefore more difficult to detect, tamper with, or remove relative to a bar code. An RFID tag cannot be removed and placed on an unauthorized replacement part in the same way that a bar code printed on a sticker can be removed and placed on an unauthorized replacement part. The entire information contained within an RFID tag can be read without even opening a shipping container. Furthermore, an RFID tag can be active, allowing for data modification and updated information over time.

These relative advantages of RFID technology to prior technology are intended to illustrate but a few of the advantageous characteristics of RFID technology, and are not intended to be an exhaustive list of RFID technology's merits. One skilled in the art can recognize the myriad advantages RFID technology possesses in relation to the prior art. Furthermore, one skilled in the art can recognize that prior technologies, such as bar coding identification, can be readily employed in combination with RFID technology. While the subject invention is described in the context of RFID technology, one skilled in the art should recognize that the subject invention can be deployed in combination with prior, non-RFID technology.

The RFID-based utilizations present important solutions to industrial problems. First, the system is automatic. Neither the parts delivery person nor the assembler needs to think about or notice parts levels. Second, the real-time feedback allows inventory to be maintained at a minimal level, simultaneously eliminating line or assembler stoppage. Maintaining inventory levels at a minimum maximizes process efficiency because only as much product as is needed is requested and delivered. Third, a system for tracking inventory levels over time can be established. Inventory delivery can be scheduled to optimize the delivery route based on constant, real-time knowledge of the parts levels. The system creates data for probabilistic and/or statistical calculations that can be used to predict or infer inventory needs based on inventory consumption patterns. Additionally, real-time monitoring of inventory levels prevents excessive inventory replenishment shipments, optimizing the inventory replenishment process. Fourth, no special automation is required in the parts shipping containers.

Currently existing shipping containers are compatible with the disclosed invention because no modification is necessary. Furthermore, the same shipping containers can be used for shipping and temporary storage prior to assembly. Additionally, no parts transfer step from the shipping container to a special rack or container that is capable of determining the level of the parts inventory. The fact that no parts transfer step is required is important in the context of air, moisture, or light-sensitive parts. These parts can be inventoried and tracked without ever removing them from their protective environments.

Referring initially to the drawings, FIG. 1 illustrates a system 100 that manages electronic product data information within an industrial control system. The system 100 includes a receiving component 102, a tracking component 104 and a replenishment component 106. In operation, RFID tagged parts/items are delivered to an assembly area in shipping receptacles, for example, containers, pallets, bins, boxes, and the like, for subsequent assembly into completed or semi-completed output by an industrial control system. It should be noted however, that while the subject invention is described as utilizing shipping receptacles as one exemplary delivery means for RFID tagged items/parts, the invention is not so limited; parts/items can be delivered in other modes, for example, as loose items/parts or the like. Upon receipt of the RFID tagged parts/items, the receiving component 102 facilitates the receipt of electronic product data information from the RFID tags associated with individual parts/items delivered to the assembly area.

The receiving component 102 upon successfully reading and/or writing electronic product information from/to RFID tags associated with individual parts/items conveys the information to a tracking component 104, whereupon the tracking component 104 stores, manipulates, and analyzes the information communicated by the receiving component 102. Further, the tracking component 104 keeps track, for example of the number of parts, types of parts, an individual part's serial number, color, dimensions, manufacturing date, current price, supplier information in relation to parts received in the assembly area, etc., as well as the rate at which parts are utilized by the industrial control system. Moreover, the tracking component 104, based on the relative rate of utilization of parts by the industrial process, can determine an optimal point at which to communicate to the replenishment component 106 a signal to inform the replenishment component 106 to order more parts from the supplier to facilitate continuous operation of the industrial process.

While the components of system 100 are depicted as being distinct, it is within the contemplative ambit of the subject invention that the facilities and components utilized by system 100 can also be carried out by a single entity carrying out the same functionality, or by a entity that combines the functionality of one or more of the components provided by system 100 into a single unit. In addition, it is within the contemplation of the inventors that the components illustrated and functionalities, and parts thereof, elucidated herein can be located on disparate systems in communicative correspondence via wired and/or wireless network technology. Exemplary technologies for this communicative correspondence include Ethernet (e.g., 10 BaseT, 100 BaseT and 1000 BaseT), serial port (e.g., RS-232 and RS-422), parallel port, coaxial cable, Universal Serial Bus (USB), IEEE 1394, and the like.

Figure 2:
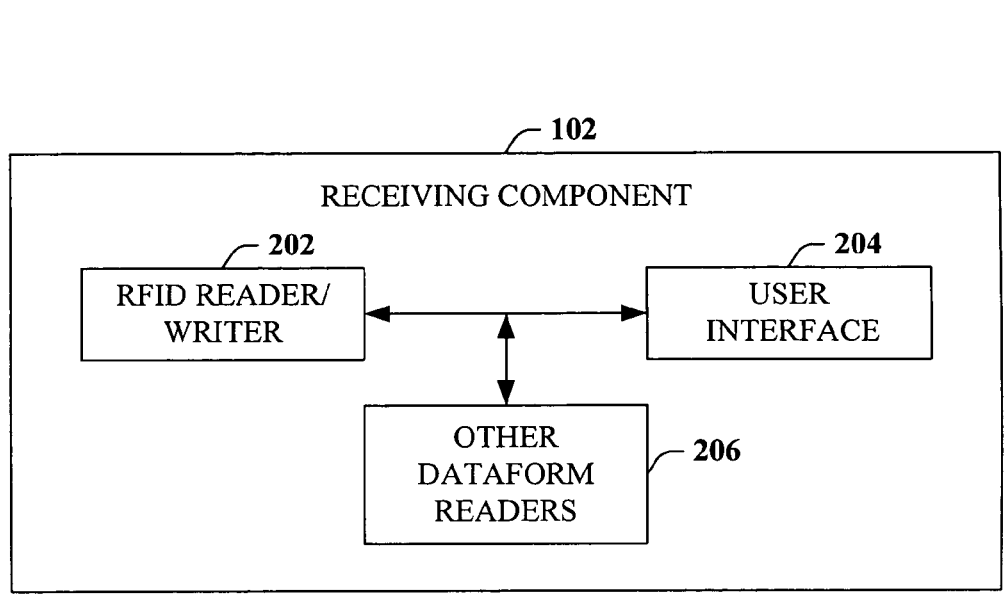
FIG. 2 illustrates an exemplary receiving component that senses information of RFID tagged items.

Referring now to FIG. 2, a system 200 depicting the constituent elements of the receiving component 102 is illustrated. The receiving component 102 can comprise one or more RFID reader/writers 202, a user interface 204 and multiple other dataform readers 206. The RFID reader/writer 202 reads RFID tags associated with incoming parts from the supplier or other entity that provides parts (e.g., internal parts manufacturing and/or distribution area). The RFID reader/writer 202 queries the RFID tags associated with individual delivered parts and accesses the electronic product data information contained within the associated RFID tags. Further, since RFID tags are uniquely differentiable, the RFID reader/writer 202 can instantaneously and simultaneously interrogate multiple RFID labeled parts/items. Thus, where RFID tagged parts/items are delivered by a supplier en masse in shipping receptacles or in loose form, the RFID reader/writer 202 can discern and classify each and every RFID labeled item/part placed within the purview of the RFID reader/writer 202. Furthermore, because the RFID reader/writer 202 has the ability to transmit and write information to the RFID tags, the RFID reader/writer 202 can add information to the RFID tagged items. Examples of information added by the RFID reader/writer 202 include date and time of receipt of the items, location of receipt of the items, identification of a user monitoring receipt of the items, other lifecycle information, etc.

The system 200 further comprises a user-interface 204 that provides an operator of an industrial control process the ability to interact with RFID reader/writer 202 and other dataform readers 206. For example, the operator of an industrial control process may need to interact with the RFID reader/writer 202 and one or more of the other dataform readers 206 in order to add, correct or modify information that the RFID reader/writer 202 and/or the other dataform readers 206 have either omitted or misread. In addition, the operator of an industrial control process can interact with the receiving component 102 through utilization of the user interface 204, for example, when parts/items received from a supplier are defective or mislabeled, or when the operator of the industrial control process perceived that some untoward event has occurred during the receipt of information from either the RFID reader/writer 202 or one or more of the other dataform readers 206.

In addition, the system 200 can further utilize one or more other dataform readers 206. These other dataform readers 206 can be any and all dataform readers generally known in the art, for example, bar-code readers, magnetic stripe readers, optical character recognition readers, etc. These other dataform readers 206 can be utilized to read and recognize other dataforms or symbologies should a delivered part/item lack an associated RFID label.

Figure 3:
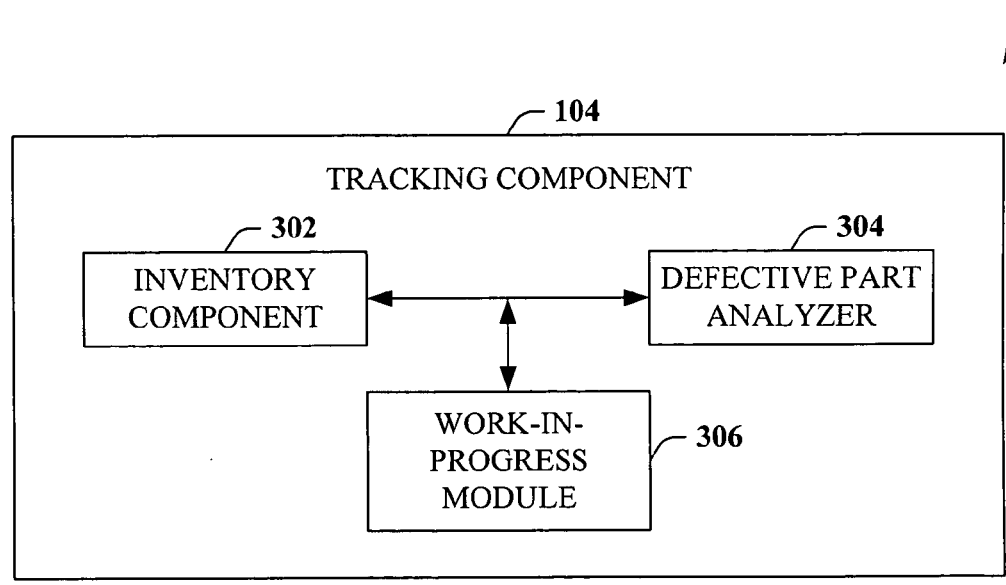
FIG. 3 illustrates an exemplary tracking component that tracks an inventory of RFID tagged items during an operation.

FIG. 3 illustrates a system 300 wherein the constituent elements of the tracking component 104 are depicted. It should be noted that while the system 300 is depicted as comprising three components, the system 300 is not so limited. The subject invention can be practiced on a single entity or via a multitude of disparate entities.

The system 300 can comprise an inventory component 302, a defective part analyzer 304 and a work-in-progress (WIP) module 306. The inventory component 302 receives electronic product data from at least one of the RFID reader/writer 202, user-interface 204 and other dataform readers 206, all of FIG. 2. Upon receipt of the electronic product data the inventory component 302 can interpret, classify, manipulate and compare the electronic product data received. The inventory component 302 can interpret the electronic product data received by parsing and/or processing the data. Further, the inventory component 302 can classify the parsed electronic product data based on attributes imbued within the incoming data, for example, part number, part type, the date of manufacture, cost, supplier information, and the like, and can convey this information to an appropriate repository for such information, such as one or more storage devices (not shown), and a plurality of databases (not shown), for example.

Additionally, the inventory component 302 can manipulate the parsed and/or processed electronic data information based on information received from the defective part analyzer 304 and/or the WIP module 306. Furthermore, the inventory component 302 can utilize information accessed from the one or more storage devices or the plurality of databases to compare with the electronic product data information received. The inventory component 302 can further aggregate the electronic product data information conveyed to it based upon specific attributes of the electronic product data information received, such as part number, part type, date of manufacture, cost, supplier information, color, and the like.

In addition, the inventory component 302 can make determinations regarding the ordering of more parts based on the rate of consumption of parts relative to the rate of assembly of the RFID tagged parts into finished or semi-finished products. Moreover, the inventory component 302 can produce a manifest of components that are incorporated into finished or semi-finished products/output during the assembly and manufacturing process by the industrial control system. These manifests so produced can be stored on one or more storage devices and/or in one or more databases. In addition, the inventory component 302 can be used to recall manifests of components previously produced from the one or more storage devices and/or one or more databases for comparison purposes and for subsequent utilization in future warranty/guarantee and repair processes.

Further, the inventory component 302 can be utilized to keep track of authorized modifications and associated replacement parts that are, and can be, installed within the finished or semi-finished product/output subsequent to the product/output being sent into the stream of commerce.

The system 300 further includes the defective part analyzer 304 that can be used in conjunction with the inventory component 302 and/or the data stored on secondary storage medium and/or databases to determine and analyze trends in parts returned as defective, or those warranting modification or further redesign and/or engineering analysis. Alternatively, the defective part analyzer 304 can be utilized separately to render analysis on defective parts that are subsequently returned. Further, the defective part analyzer 304 can be used to undertake materials analysis to ensure that the materials utilized in constituent parts conform to industry and/or statutory regulations and requirements.

Figure 4:
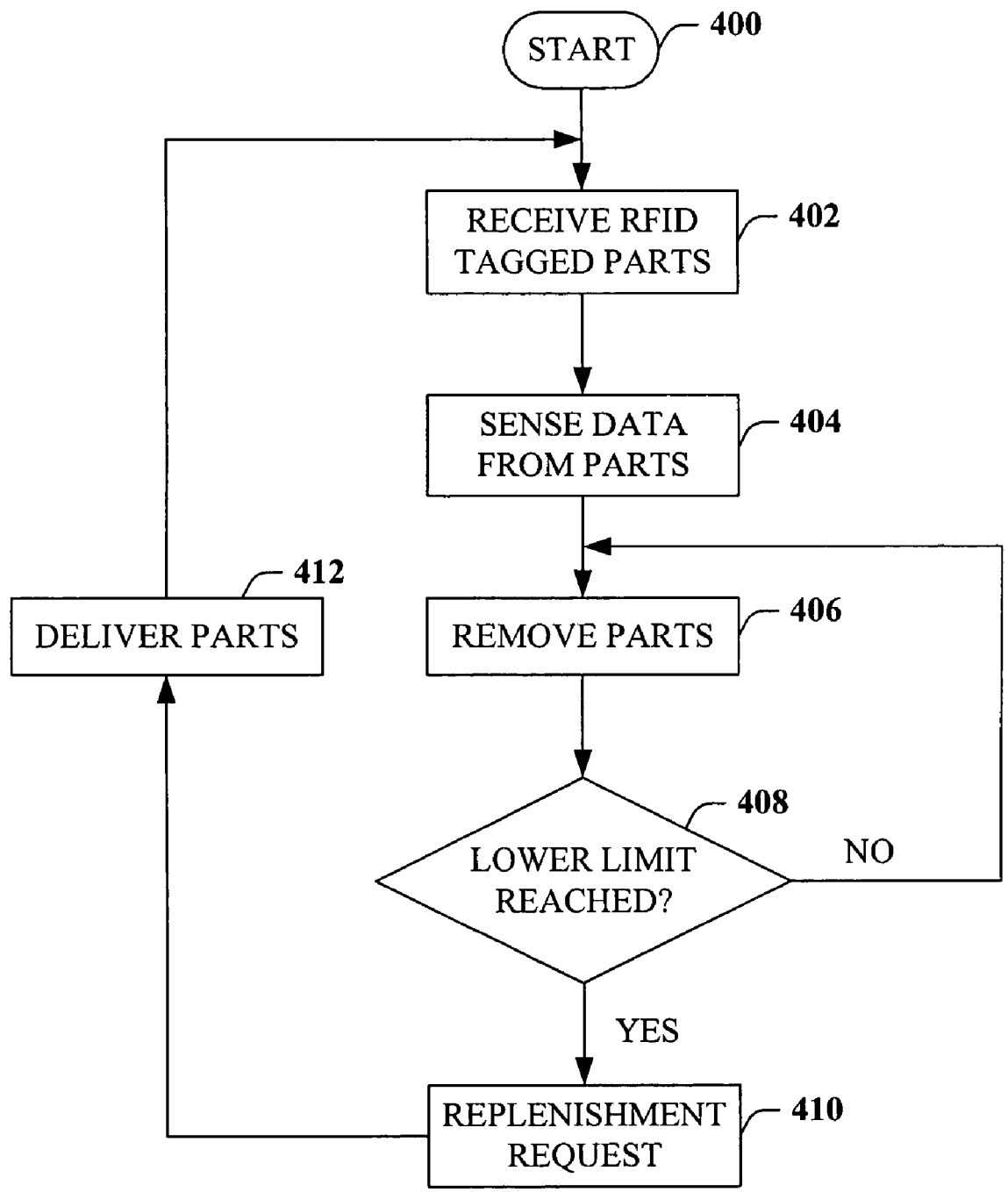
FIG. 4 illustrates a methodology of tracking an inventory of RFID tagged items during an operation and replenishing the inventory when it has reached a predetermined limit.

Referring now to FIG. 4, there is illustrated a methodology of inventory management using RFID tagged parts and an RFID reader/writer 202, in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 402, RFID tagged parts are received. The RFID tags in or on the RFID tagged parts can be active RFID devices, or passive RFID devices. Active RFID tags contain an internal battery or other suitable power source and are typically read/write devices. That is to say, the tag data can be rewritten and/or modified. The memory size of an active tag varies depending on the application requirements and, since it is powered onboard, it generally has a longer or wider read range or coverage area than a passive tag. Passive tags do not have an internal power source and obtain power generated by a reader. A read-only tag is a passive device and is generally programmed with a unique set of data that, in one implementation, cannot be modified, and in another implementation, can be modified. The RFID tags can be of any convenient size and complexity. The RFID tagged parts can be delivered an assembly area. One skilled in the art can recognize that the location where the RFID tagged parts are delivered is not limited to an assembly area; the RFID tagged parts can be delivered to a sub-assembly area, a staging area, a receiving area, a mail room, a storage room, and the like. All that is required is some place where a plurality of RFID tagged parts is kept prior to assembly, accessible by a feeder component (not shown) that removes the RFID tagged parts for assembly.

At 404, an RFID reader/writer senses electronic data from the RFID tagged parts. The RFID reader/writer can be various components that read, write, receive, and/or store electronic product data, such as readers, writers and/or servers, and can be a handheld device or a fixed-mount device or a combination of such RFID devices depending on the particular application. The RFID reader/writer can broadcast a signal or radio waves via an antenna or a plurality of antennas (not shown). The antenna for any particular device can be of any type suitable for use in a wireless communications system, such as a dipole antenna, a yagi-type antenna, etc. The coverage area or signal range of the RFID reader/writer can be anywhere from about one inch to about one hundred feet or more, depending upon the radio frequency used and the power output. The frequency range of the RFID reader/writer can be a low-frequency range (e.g., from about 30 KHz to about 500 KHz), an intermediate-frequency range (e.g., about 10 MHz to about 15 MHz) or a high-frequency range, (e.g., from about 850 MHz to about 950 MHz and about 2.4 GHz to about 2.5 GHz). Higher frequency ranges offer longer read ranges (e.g., about 90 feet or more) and higher reading speeds. The signal can be continuously transmitted or periodically transmitted, such as when activated by a sensor device.

The RFID reader/writer reads data recorded in the RFID tags. One skilled in the art can recognize that any data recorded or written onto the RFID tags can be read by the RFID reader/writer. Examples of data that the RFID reader/writer can read from the RFID tags include part identification number, part type, date of part manufacture, part cost, part supplier information, part color, or part composition. Additionally, the RFID reader/writer can transmit and write data to the RFID tags. For example, the RFID reader/writer can transmit data to write to the RFID tags to indicate that they have been scanned and processed by the RFID reader/writer. Alternatively, the RFID reader/writer can write the time when the RFID tagged parts were read and written.

At 406, RFID tagged parts are removed from the inventory of parts during assembly. A feeder component (not shown) removes the RFID tagged parts from the inventory. This feeder component can be virtually any industrial transport component, such as an assembly line conveyor belt, a forklift, a crane, a robotic arm, and the like, or even a human tasked with doing so. At the removal of an RFID tagged part from the inventory, the system determines if a predetermined part limit has been reached, at 408. The determination is accomplished by using the RFID reader/writer to scan the entire inventory or that part of the inventory related to the part to determine how many RFID tagged parts remain after the removal of a part. One skilled in the art can recognize that the RFID reader/writer can perform the task of scanning the entire inventory at any convenient interval, for example, after every single part is removed, after five parts are removed, after ten parts are removed, etc.

If the predetermined part limit has not been reached, then return to the input of 406 and continue to remove RFID tagged parts from the inventory. If the predetermined part limit has been reached, flow is from 408 to 410 where a replenishment request event is generated. The replenishment request event delivers or causes to be delivered RFID tagged parts, as indicated at 412. Flow is then back to 402 to continue monitoring the consumption of RFID tagged parts during assembly and replenishing the pool of RFID tagged parts when the number of RFID tagged parts reaches a predetermined limit.

Figure 5:
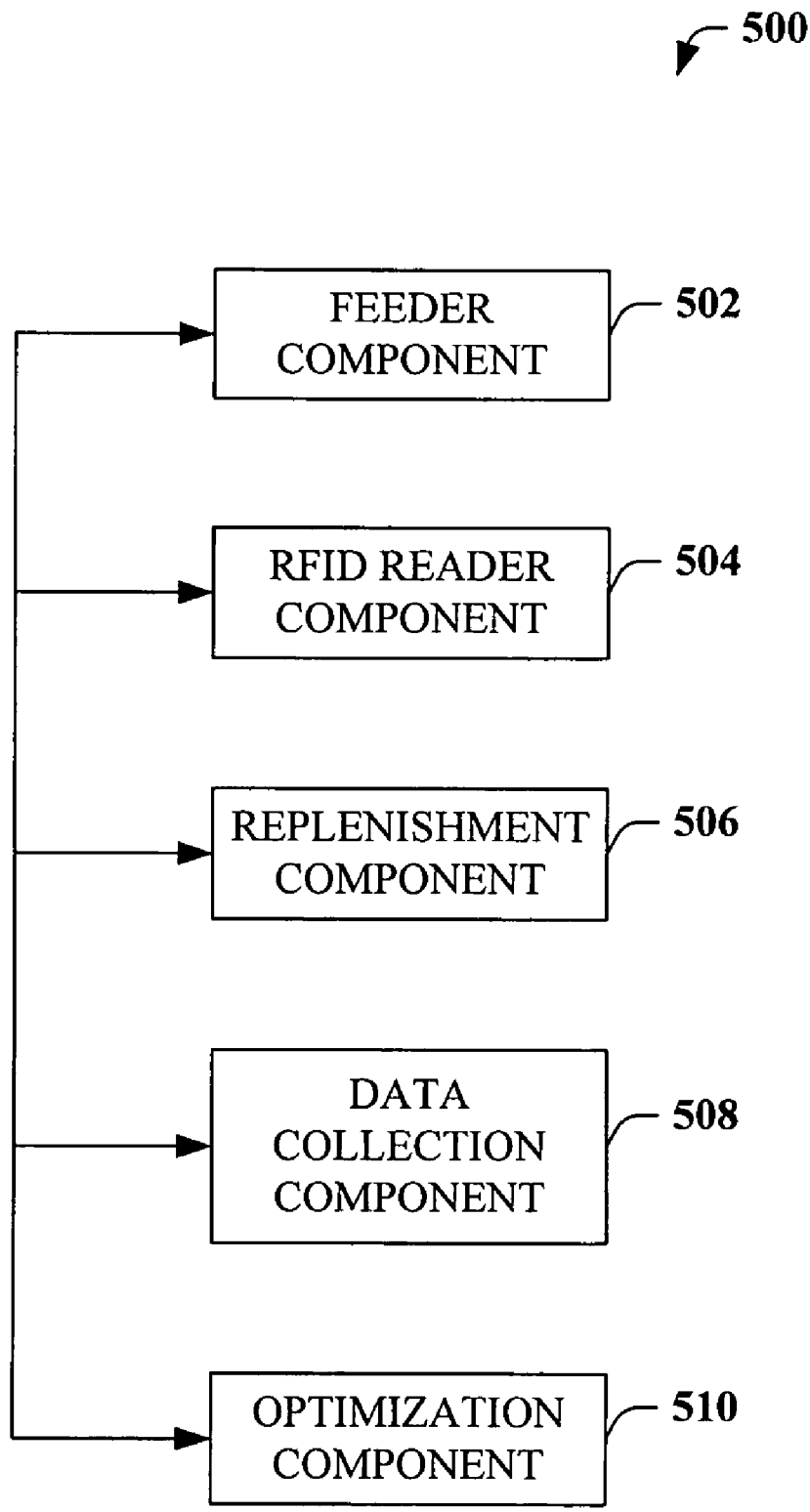
FIG. 5 illustrates an exemplary system that follows replenishment patterns and uses statistical and/or probabilistic algorithms to optimize replenishment.

FIG. 5 illustrates a system 500 that automatically tracks an RFID-based inventory and replenishes the RFID-based inventory once the inventory reaches a predetermined limit. A feeder component 502 removes an RFID tagged part (not shown) from an inventory. An RFID reader/writer component 504 reads and/or writes information from/to the RFID tagged part. The RFID reader/writer 504 reads any data recorded in the RFID tags. Examples of data that the RFID reader 504 can read from the RFID tags include part identification number, part type, date of part manufacture, part cost, part supplier information, part color, or part composition. One skilled in the art can recognize that any data recorded or written onto the RFID tags can be read by the RFID reader/writer 504.

Furthermore, one skilled in the art can recognize that while only one RFID reader/writer 504 is shown, any number of RFID reader/writers 504 can be employed, according to the desired functional requirements concerning the application. The RFID reader/writer 504 can read RFID tagged parts individually as they are removed from the inventory of RFID tagged parts. Alternatively, the RFID reader/writer 504 can read RFID tagged parts en masse when the RFID tagged parts are kept together in a suitable area, such as an inventory storage area, a delivery area, a staging area, a sub-assembly area, and the like. Additionally, the RFID reader/writer 504 can transmit and write data to the RFID tags. For example, the RFID reader/writer 504 can transmit data to write to the RFID tags to indicate that they have been scanned and processed by the RFID reader/writer 504.

As the inventory of RFID tagged parts is depleted during assembly (not shown), the RFID reader/writer component 504 determines whether or not a predetermined limit of the inventory of RFID tagged parts has been reached. If the predetermined limit has not been reached, the RFID reader/writer component 504 can optionally communicate to the feeder component 502 that additional RFID tagged parts can be removed from the inventory. If the predetermined limit has been reached, the RFID reader/writer component 504 sends a replenishment request to a replenishment component 506. The replenishment component 506 delivers or causes to be delivered additional parts.

Optionally, the replenishment component 506 can communicate information to a data collection component 508. The data collection component 508 can be anything capable of storing information for future reference. Examples of suitable data collection components include software programs, computers, personal data assistants, servers, and the like. An optimization component 510 analyzes the information communicated by the data collection component 508. The optimization component 510 can use any suitable algorithm to analyze the information communicated by the data collection component 508.

For example, optimizing the system 500 can be facilitated via an automatic classifier system and process. Moreover, where a plurality of reader/writers (not shown) are employed, the classifier can be employed to determine which RFID reader/writer to adjust for improved accuracy and/or determine which RFID tags have been read and which require further reading.

A classifier is a function that maps an input attribute vector, x=(x1, x2, x3, x4, xn), to a class label class (x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or a training phase within a classifier constructor and feature selection module. Thus, the classifier(s) can be used to automatically learn and perform a number of functions, including but not limited to determining according to a predetermined criteria when to adjust the antenna and/or signal strength of an RFID reader/writer or when to rescan an area to find RFID tags that have not been read by the RFID reader/writer, for example.

It should be noted that while the system 500 is depicted as comprising multiple components, the system 500 is not so limited. The subject invention can be practiced on a single entity or on a multitude of disparate entities. Similarly, the function of each component in the system 500 can be performed by a single component or a multitude of disparate entities.

Figure 6:
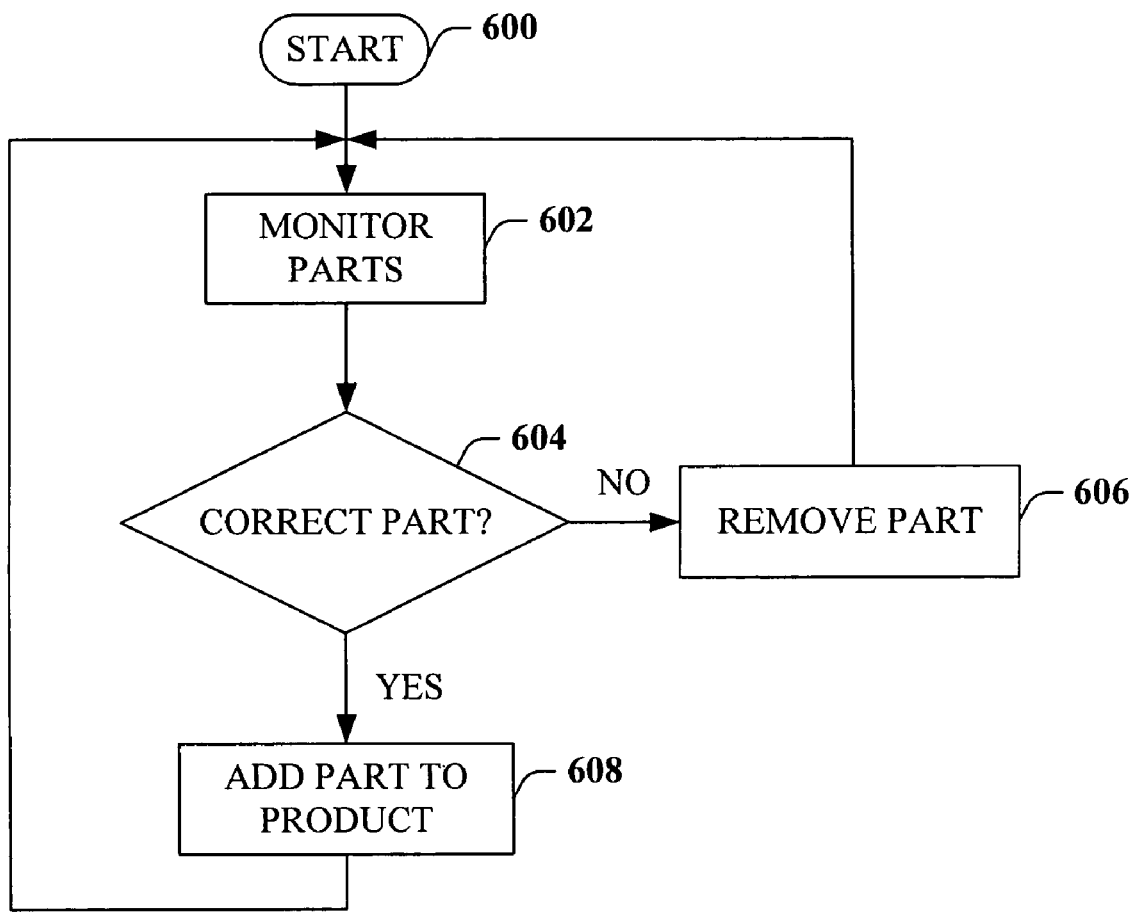
FIG. 6 illustrates a methodology of verifying correctness of an RFID tagged part before the part is incorporated into a multipart product.

FIG. 6 illustrates a methodology 600 of monitoring the correctness of RFID tagged parts during assembly of a product, in accordance with the invention. At 602, the RFID tagged parts are monitored during the assembly process. In this particular methodology, the RFID tagged part type is monitored. At 604, the system determines if the part type is correct. If NO, then the RFID tagged part is removed, at 606, and flow returns to monitoring RFID tagged parts, at 602. If YES, flow is from 604 to 608 where the part is incorporated into the partially assembled product. Flow is then back to the monitoring of RFID tagged parts 602.

Figure 7:
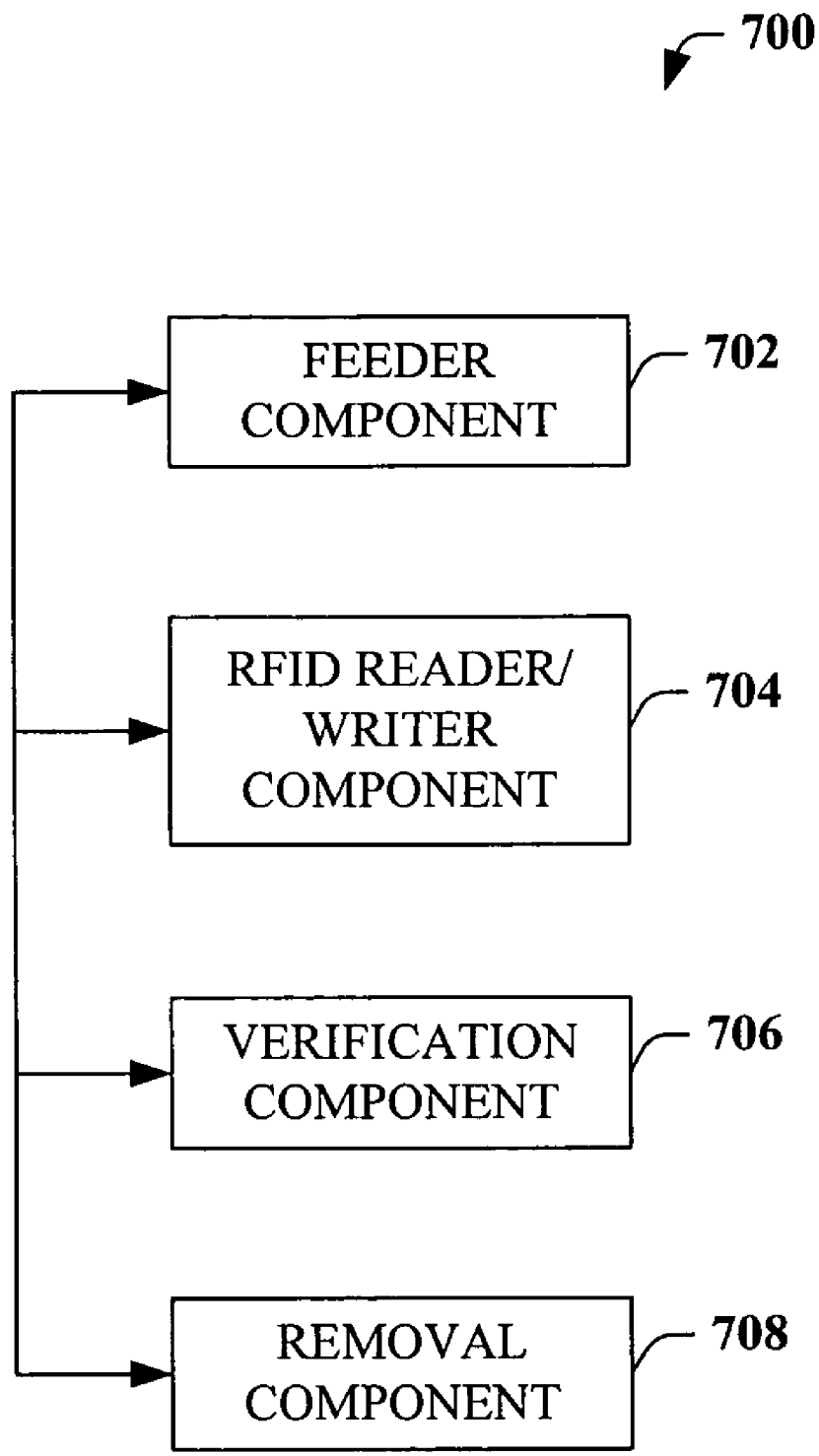
FIG. 7 illustrates an exemplary system that verifies correctness of an RFID tagged part before the part is incorporated into a multipart product.

FIG. 7 illustrates a system 700 for monitoring the correctness of RFID tagged parts during assembly of a product, in accordance with the invention. A feeder component 702 selects RFID tagged parts from an inventory (not shown). The electronic information from the RFID tagged parts is read by an RFID reader/writer component 704. The RFID reader/writer component 704 communicates the electronic information from the RFID tagged parts to a verification component 706.

The verification component 706 determines the correctness of the RFID tagged parts, based at least in part on the electronic information read by the RFID reader/writer component 704. Examples of electronic information read by the RFID reader/writer component 704 that the verification component 706 uses in determining the RFID tagged parts' correctness include part identification number, part type, date of part manufacture, part cost, part supplier information, part color, or part composition. However, one skilled in the art can recognize that electronic information from the RFID tagged parts is not so limited; virtually any information recorded on the RFID tag can be used by the verification component 706 in determining the correctness of the RFID tagged parts. The verification component 706 analyzes electronic information from the RFID reader/writer component 704 to determine at least one of: whether the RFID tagged parts are required pieces, or whether the RFID tagged parts are the proper pieces among a set of options. If the verification component 706 determines that the RFID tagged parts are required or proper pieces, the pieces are then sent on to assembly (not shown). If the verification component 706 determines that the RFID tagged parts are neither required nor proper pieces, the pieces are then removed by a removal component 708.

It should be noted that while the system 700 is depicted as comprising multiple components, the system 700 is not so limited. The subject invention can be practiced on a single entity or on a multitude of disparate entities. Similarly, the function of each component in the system 700 can be performed by a single component or a multitude of disparate entities.

Figure 8:
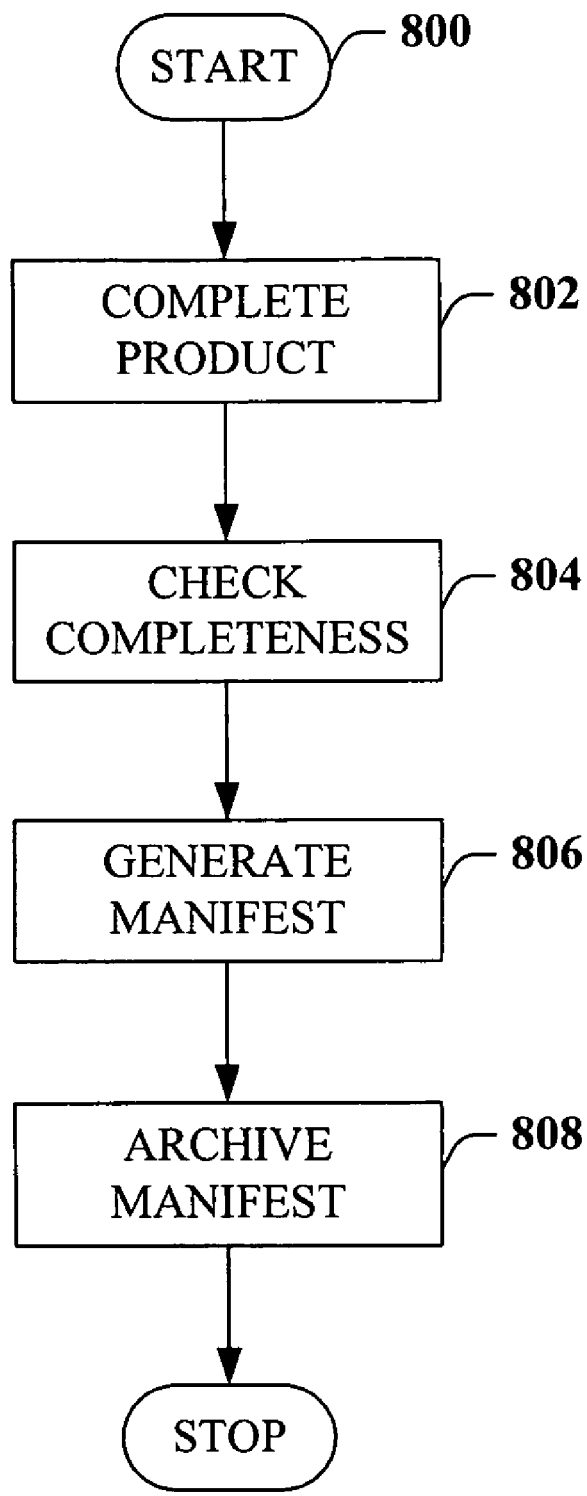
FIG. 8 illustrates a methodology of checking completeness of a completely assembled product and generating and archiving a manifest associated with the product.

Referring now to FIG. 8, there is illustrated a methodology 800 of checking a completely assembled product for completeness, in accordance with the invention. A product is assembled using RFID tagged parts (not shown). The assembled product can contain one or more RFID tagged parts; however, it is not necessary that all parts in the assembled product be tagged with RFID tags. Some, most or all of the parts in the assembled product can be RFID tagged parts. At 802, the assembled product is completely assembled. The completely assembled product is subjected to verification for completeness by checking for completeness at 804 by reading the electronic information from the RFID tagged parts. Examples of electronic information read in the verification for completeness include part identification number, part type, date of part manufacture, part cost, part supplier information, part color, or part composition. However, one skilled in the art can recognize that electronic information from the RFID tagged parts is not so limited; virtually any pertinent electronic information encoded on the RFID tags can be interrogated for completeness.

At 806, a manifest for the completely assembled product is generated. The manifest can include the types of information described supra. For example, the manifest can include part identification number, part type, etc. One skilled in the art can recognize that any pertinent or important information encoded on the RFID tags and read by the RFID reader can then be included in the manifest. The electronic information included in manifest is then archived, at 808. The archive can be stored in a convenient medium for stable, long-term storage as well as for future reference. One skilled in the art can recognize a number of convenient media for such purposes.

Figure 9:
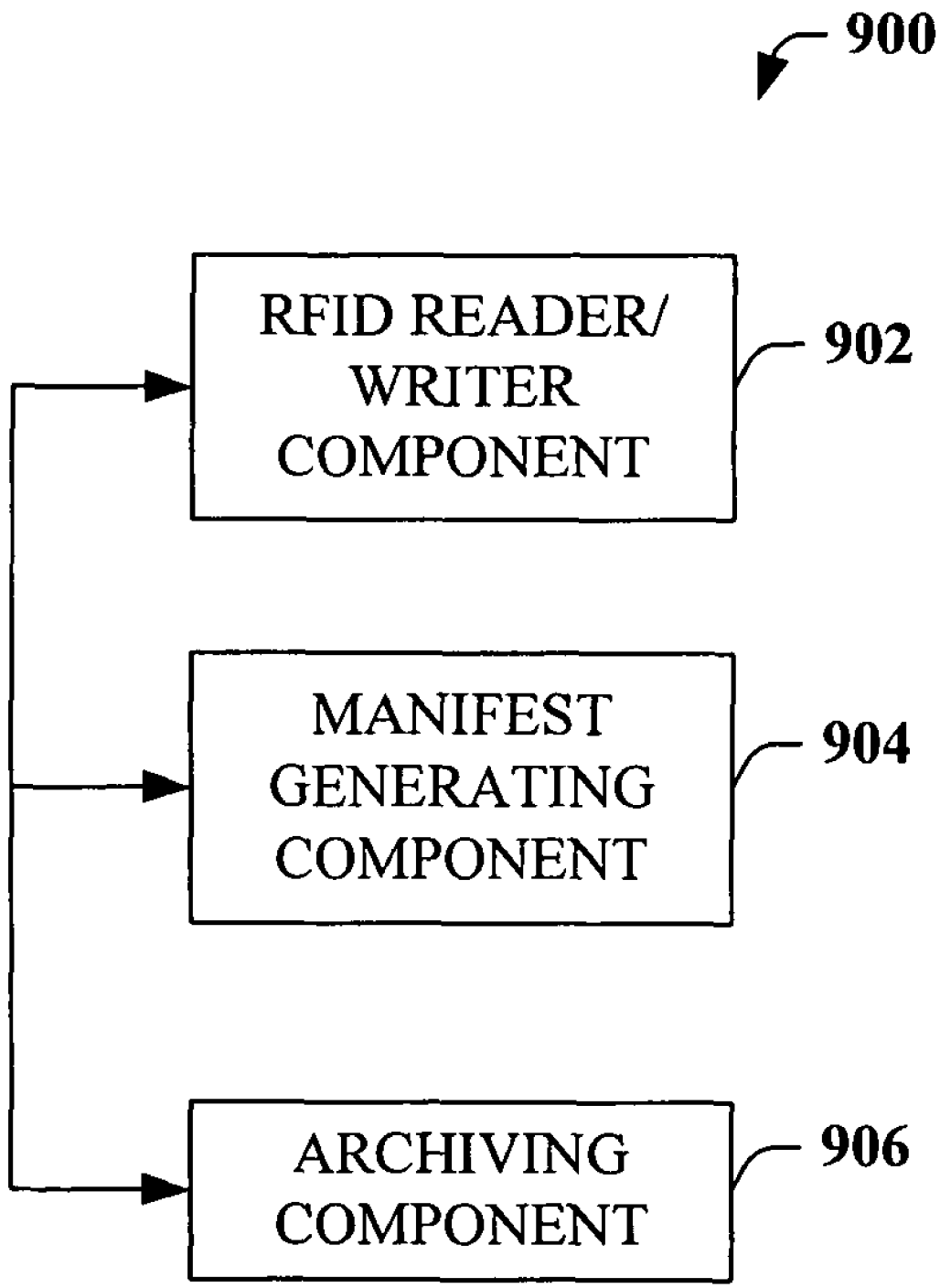
FIG. 9 illustrates an exemplary system that checks completeness of a completely assembled product, generates a manifest associated with the product, and archives the manifest for future reference.

FIG. 9 illustrates a system 900 for verifying the completeness of a completely assembled product and generating a manifest for the completely assembled product, in accordance with the subject invention. A completely assembled product (not shown) includes one or more RFID tagged parts. Once the assembly finishes with the completely assembled product, the one or more RFID tagged parts of the completely assembled product are read by an RFID reader/writer component 902. The RFID reader/writer component 902 reads the electronic information from the RFID tagged parts in the completely assembled product. Examples of electronic information read in the verification for completeness include part identification number, part type, date of part manufacture, part cost, part supplier information, part color, or part composition. However, one skilled in the art can recognize that electronic information from the RFID tagged parts is not so limited; virtually any pertinent electronic information encoded on the RFID tags can be used for verifying completeness.

The RFID reader/writer component 902 communicates the electronic information to a manifest generating component 904. The manifest generating component 904 receives and analyzes the types of information described previously. For example, the manifest generating component 904 receive and analyze part identification number, part type, etc., read from the RFID tags on the RFID tagged parts incorporated into the completely assembled product. One skilled in the art can recognize that any pertinent or important information encoded on the RFID tags and read by the RFID reader can then be read and analyzed by the manifest generating component 904.

After reading and analyzing the electronic information from the RFID reader/writer component 902, the manifest generating component 904 communicates the electronic information to an archiving component 906 for storage and future reference purposes. The archiving component 906 can include any convenient medium for stable, long-term storage as well as for future reference. One skilled in the art can recognize a number of convenient media for such purposes.

Although the RFID reader component 902, the manifest generating component 904, and the archive component 906 are shown as three distinct entities, the subject invention is not so limited. It is to be appreciated that all three components can be integrated into a single entity, or two components can be integrated into a single entity with the other component remaining a distinct entity, etc. Similarly, there can be more than three distinct components that perform the same functional tasks as the RFID reader component 902, the manifest generating component 904, and the archive component 906.

Figure 10A:
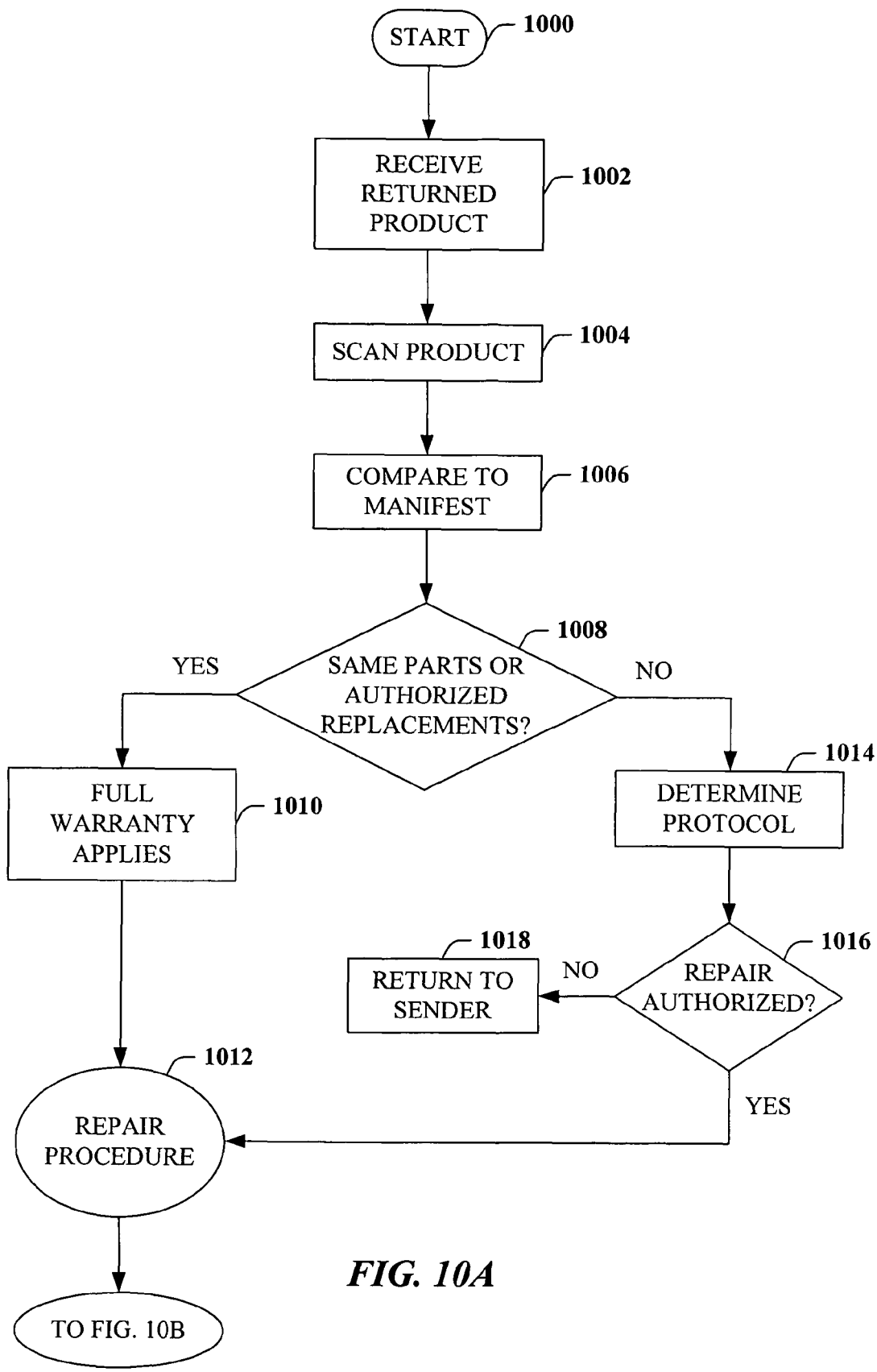
FIG. 10A illustrates a methodology of determining whether products returned by consumers to a manufacturer or a representative have the same RFID tagged parts composition as the product manifests or authorized replacement RFID tagged replacement parts, in accordance with the subject invention.
Figure 10B:
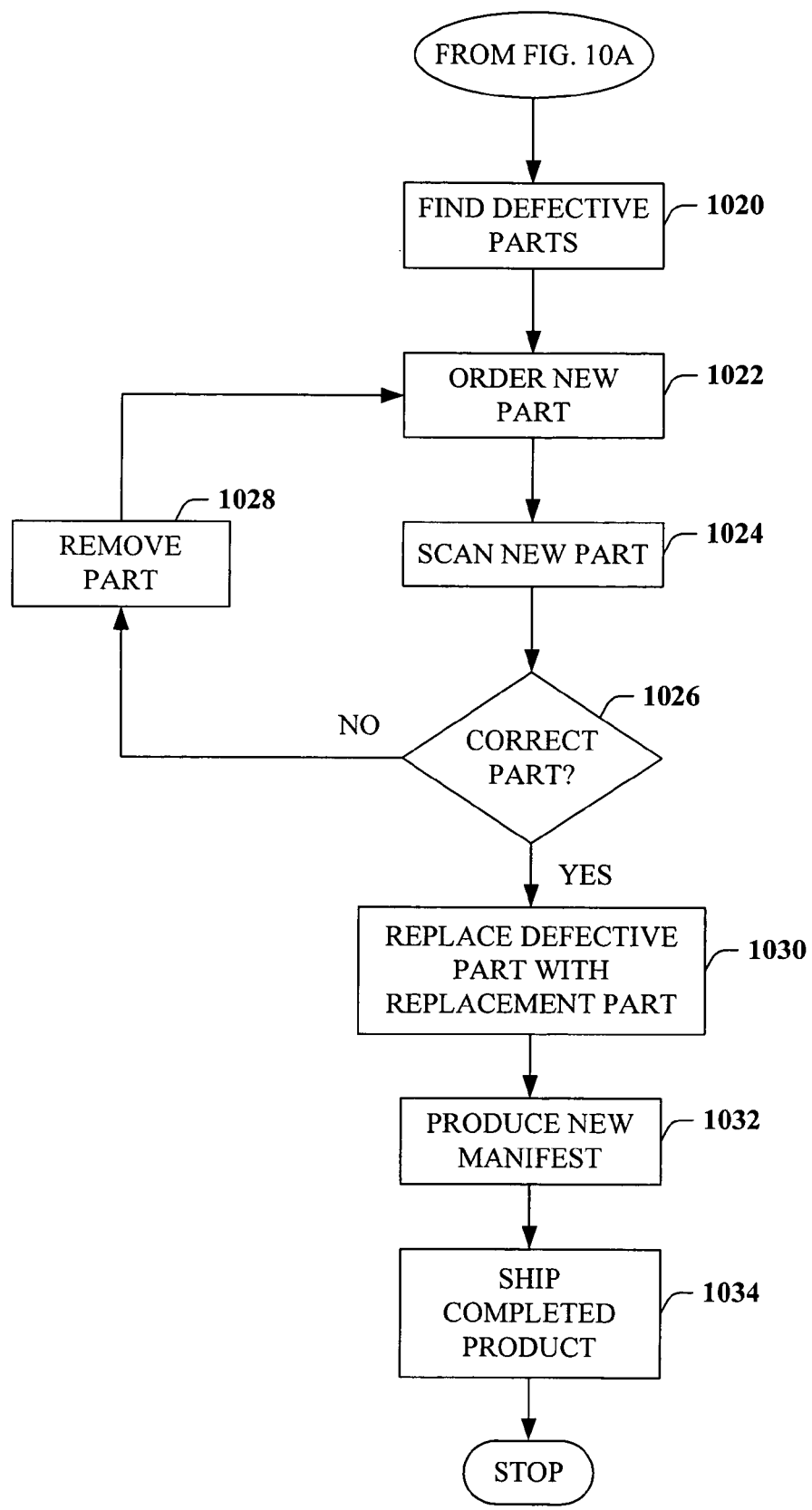
FIG. 10B further illustrates a repair process methodology for repairing and/or replacing defective RFID tagged parts in returned products, in accordance with the subject invention.

FIGS. 10A and 10B illustrate a methodology of processing returned products for warranty repair. FIG. 10A illustrates a methodology 1000 of determining whether products returned by consumers to a manufacturer or a representative have the same RFID tagged parts composition as the product manifests or authorized replacement RFID tagged replacement parts, in accordance with the subject invention. At 1002, a returned product is received. At 1004, the returned product containing RFID tags is scanned using an RFID reader/writer. The scanning step reads the RFID tags for information kept on the RFID tags embedded in the parts. Examples of information scanned include part identification numbers, part type, date of part manufacture, part cost, part supplier information, part color, or part composition. However, the information kept on the RFID tag is not so limited; these particular characteristics are but a few of the possible data kept on the RFID tag. One skilled in the art would recognize that any readable data kept on the RFID tag can be read in the scanning step of this methodology.

The information kept on the RFID tag is then compared to the product's outgoing manifest data, at 1006. For example, the part identification numbers of the RFID tagged parts in the returned product can be compared to the part identification numbers of the RFID tagged parts in the product's manifest when it was shipped from assembly. For a further example, the part identification numbers of the RFID tagged parts in the returned product can be compared with the part identification numbers of the RFID tagged parts that were authorized as replacement parts. However, the comparison is not limited to only part identification numbers; any data read from the RFID tagged parts in the returned product can be compared to information stored in the product's outgoing manifest data.

At 1008, the system determines if the RFID tagged parts are the same original parts or authorized replacement parts. If YES, then the full warranty applies, at 1010. The full warranty application leads to the initiation of a repair process, at 1012. An alternative to the repair process is the replacement (not shown) of the returned product with a new completely assembled product in lieu of performing repairs on the returned product. The replacement (not shown) of the returned product is convenient for the manufacturer if the costs of repairing the returned product exceed the cost of simply providing a new completely assembled product to the consumer. If NO, then it is necessary to determine repair or warranty protocol, at 1014, in light of the detection of different parts and unauthorized replacement parts.

At 1016, the system determines if repair is authorized under warranty and repair policies and procedures. If NO, at 1018, then the product is returned to the consumer. If YES, then the repair process at 1012 is initiated. Again, one skilled in the art can recognize that an alternative to the repair process is the replacement of the returned product (not shown) with a new completely assembled product in lieu of performing the repair process, where the repair process is more expensive than simply replacing the returned product with a new completely assembled product.

FIG. 10B further illustrates a repair process methodology for repairing and/or replacing defective RFID tagged parts in returned products, in accordance with the subject invention. Once it is determined that the repair process is to be initiated, the defective parts are found, as indicated at 1020. There are a variety of methods appropriate for determining which parts are defective. For example, defective parts can be determined by visual inspection, diagnostic testing, measuring physical properties and comparing the observed physical properties to standard values, and the like. The nature of the defect will vary with regard to the nature of the part and the product.

Once the defective parts are found, new parts can be ordered, at 1022. The new parts can come from the same source of parts as the original parts, defective parts, or from a different source. The new parts can be newer versions of the original parts. Once the ordered new part has been received, its RFID tags are scanned, at 1024, with an RFID reader. After scanning the new part, the replacement part is checked for correctness, at 1026. If the new part is not the correct part, flow is to 1028 where it is removed. Flow is then back to 1022 where another part is ordered. If the replacement part is correct, flow is from 1026 to 1034 where the defective part is replaced with the replacement part. The electronic information of the replacement part is placed in a new completely assembled product manifest, as indicated at 1032 and archived for long-term storage as well as for future reference (not shown). Finally, at 1034, the repaired product is shipped back to the consumer.

Figure 11:
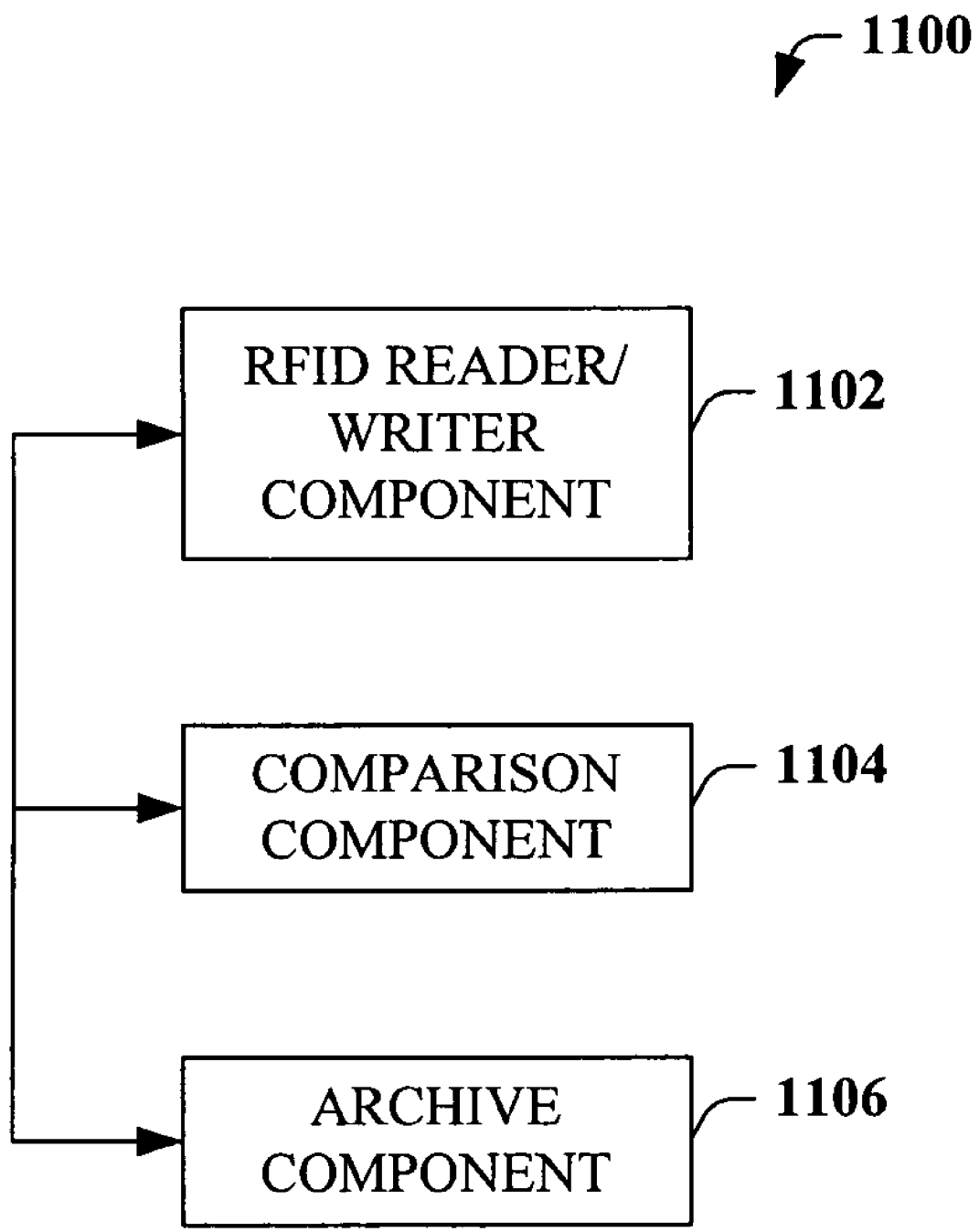
FIG. 11 illustrates an exemplary system that determines the as-returned composition of a returned product and compares the as-returned composition to a valid composition.

FIG. 11 illustrates a system 1100 for repairing defective RFID tagged parts in products that consumers return to a manufacturer or a representative, in accordance with the subject invention. A returned product containing RFID tagged parts (not shown) is scanned for electronic information kept on the RFID tags by an RFID reader/writer component 1102. Examples of electronic information read include part identification number, part type, date of part manufacture, part cost, part supplier information, part color, or part composition. However, one skilled in the art can recognize that electronic information kept on the RFID tagged parts is not so limited; virtually any pertinent electronic information encoded on the RFID tags can be read in the method.

The RFID reader/writer component 1102 communicates the electronic information to a comparison component 1104. The comparison component 1104 then stores and compares the returned product composition to the as-built product composition data supplied by an archive component 1106. The archive component 1106 communicates to the comparison component 1104 the valid composition of the returned product. Generally, the valid composition of the returned product is the product's outgoing manifest data, or the as-built composition, which is generated when the product is completely and correctly assembled. However, in instances involving at least one authorized modification of the product with an RFID tagged replacement part, the valid composition of the returned product is the as-built composition of the product with the relevant replacement parts substituted for the original parts.

The comparison component 1104 can perform any number of comparisons between the electronic information received from the RFID reader component 1102 and archival information from the archive component 1106. For example, the comparison component 1104 can compare part identification numbers read from the RFID tagged parts in the returned product to part identification numbers from the product's valid composition. It is to be appreciated that the comparison component 1104 is not limited to comparing part identification numbers; any information that is commonly kept on the RFID tags and in the product's valid composition can be compared. As described above, electronic information kept on the RFID tags can be virtually any data pertinent to product manufacturing management and/or product lifecycle management.

It is to be appreciated that all of the systems and methods disclosed herein can be implemented in conjunction with a programmable logic controller (PLC) component. The PLC component can be used to control any of the components described. The PLC component can be used to perform any of the methods described. The PLC component can be that which is typically utilized in a manufacturing, distribution, sales or any similar environment where products (or objects) are tagged with an RFID tag and logistically managed. In highly automated environments, PLCs (or other types of industrial controllers) are typically utilized in enclosures and/or chassis (not shown) that are in rack mount configurations at selected locations throughout the environment with additional modules employed therein for applications such as discrete I/O, power, communications, etc.

It is also to be appreciated that all of the systems and methods disclosed in this detailed description can be implemented in conjunction with previously installed control, visualization and information infrastructure. Such combinatorial implementation reduces the need for purchasing new infrastructure or investing in expensive, time-consuming, and unproven information technology integration projects. This combinatorial implementation allows for a gradual changeover to a more RFID-based infrastructure while simultaneously realizing efficiency gains associated with the use of RFID technology.

Figure 12:
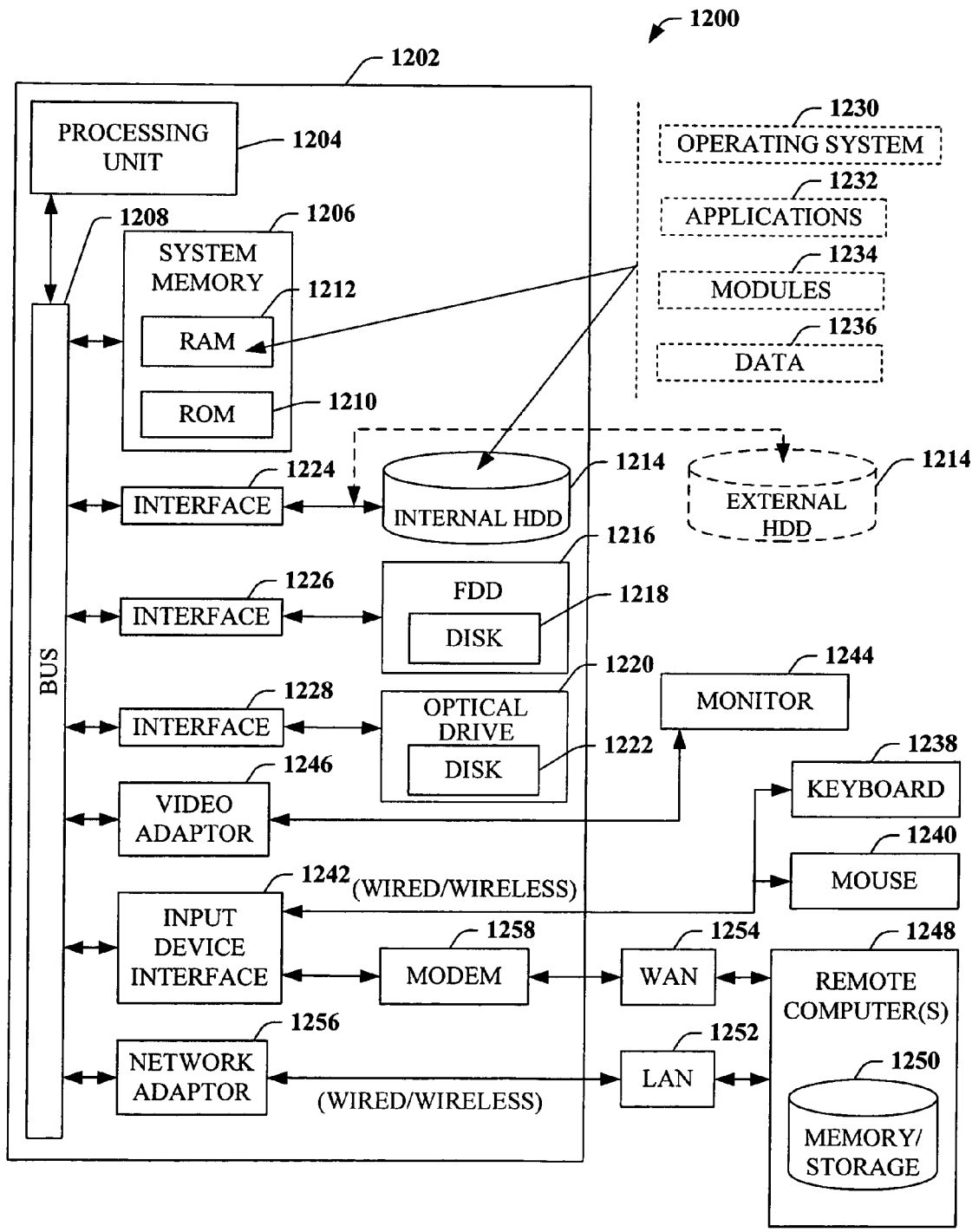
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects thereof, FIG. 12 and the following discussion are intended to provide a brief, general description of a suitable computing environment 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 13:
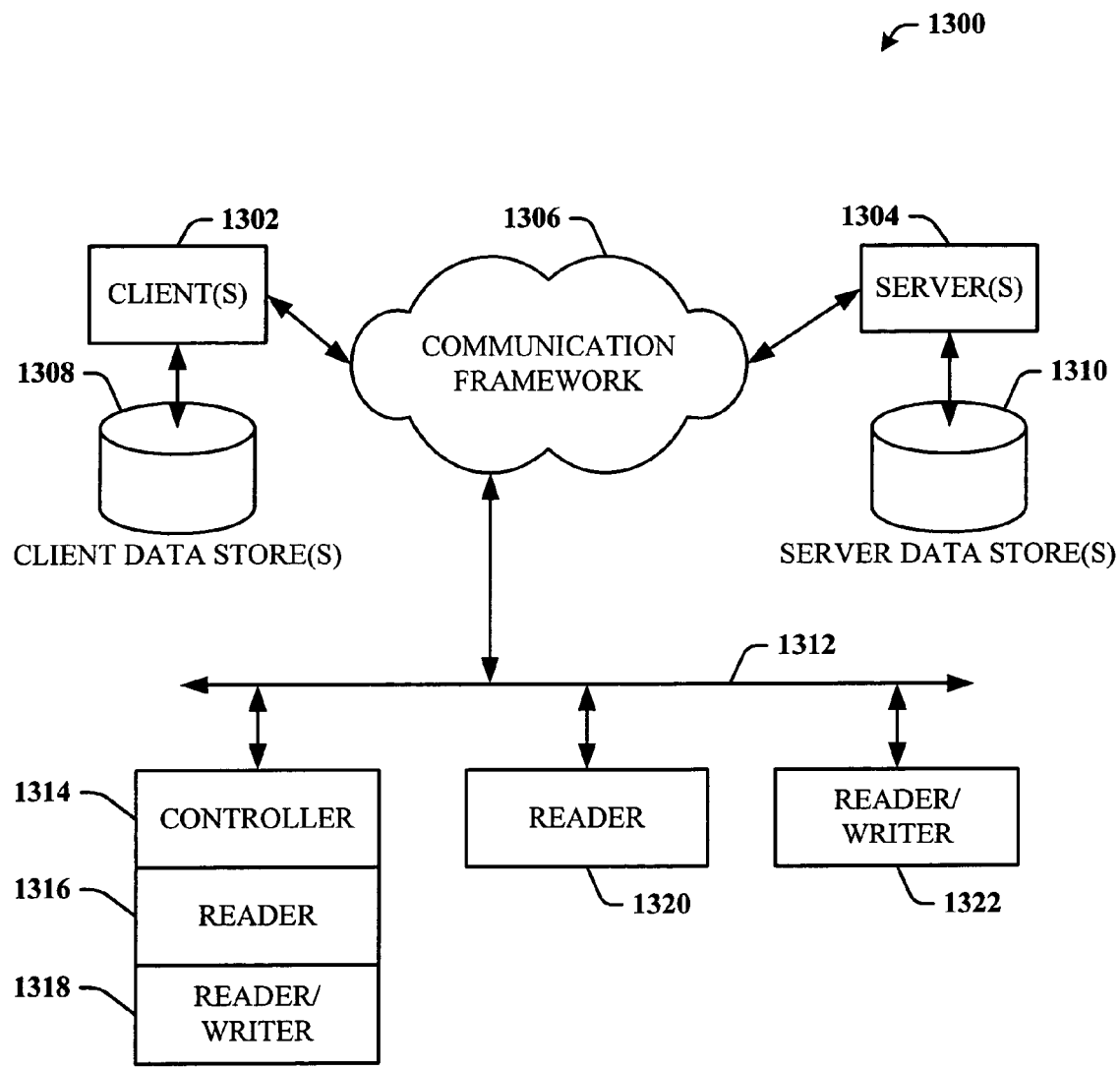
FIG. 13 illustrates a schematic block diagram of an exemplary computing environment that facilitates parts management in accordance with the subject invention.

Referring now to FIG. 13, there is illustrated a schematic block diagram of an exemplary computing environment 1300 that facilitates parts management in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The framework 1306 can also include a subnetwork 1312, for example, that can be implemented as in an assembly line environment. The subnetwork 1312 can have disposed thereon as nodes, a controller 1314 (e.g., a PLC) that controls a reader module 1316 and a reader/writer module 1318 both of which can read RFID tags, and the latter of which can write data to the RFID tags. The controller 1314, reader module 1316 and reader/writer module 1318 can be provided in a rack configuration at selected locations. Alternatively or in combination therewith, the subnetwork 1312 can also include a second reader module 1320 as a wired or wireless node (or client) that is positioned (fixed or mobile) to read RFD tags, as needed. Similarly, the subnetwork 1312 can also support a reader/writer module 1322 as a wired and/or wireless client node for reading and writing data and signals to RFID tags that come within a coverage area.

What has been described above includes examples of the invention. It is, of course, not possible to describe every conceivable combination of components or methodologies for purposes of describing the subject invention, but one of ordinary skill in the art can recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates item management, comprising:
an item receiving component that automatically detects a radio frequency identification (RFID) tagged item for processing;
a tracking component that tracks inventory depletion of the RFID tagged item during operation of an industrial assembly process, the tracking component employs at least one of probabilistic or statistical analysis to infer an inventory requirement of the RFID tagged item and determine an optimal inventory point to generate an inventory replenishment request for the RFID tagged item, the tracking component generates a replenishment request when a quantity of the RFID tagged item reaches the optimal inventory point; and
a replenishment component that delivers additional RFID tagged items.

2. The system of claim 1, the item receiving component communicates information from an RFID tag associated with the item to the tracking component.

3. The system of claim 1, the item receiving component comprises an RFID reader, a user interface, and one or more dataform readers.

4. The system of claim 3, the RFID reader is located on a container that includes the tagged item.

5. The system of claim 3, the RFID reader is located at a delivery area through which the tagged item passes.

6. The system of claim 1, the inferred inventory requirement is based upon a real-time rate of utilization of the part in a product assembly area t.

7. The system of claim 1, the tracking component comprises at least one of an inventory component, a defective part analyzer, or a work-in-progress module.

8. The system of claim 7, the defective part analyzer analyzes at least one of RFID tagged item information stored during the industrial assembly process or RFID tagged item information obtained during product returns to determined whether at least one of an item modification, an item redesign, or an item engineering analysis is warranted for the RFID tagged item.

9. The system of claim 1, the tracking component communicates a replenishment request to inform the replenishment component to at least one of order more items from a supplier or deliver one or more items from another internal or external inventory area to facilitate continuous operation of the industrial process.

10. The system of claim 1, the replenishment component responds to a replenishment request by delivering additional RFID tagged items.

11. The system of claim 1, further comprising a data collection component that records electronic data related to replenishment requests and data related to the operation of the industrial process.

12. The system of claim 11, the data related to the operation of the industrial process includes a manifest for each of a plurality of assembled products, wherein the manifest includes a unique identifier for each RFID tagged item installation in the assembled product associated with the manifest.

13. The system of claim 1, wherein the tracking component updates the manifest upon the RFID tagged item being replaced in the assembled product associated with the manifest, wherein the update includes unique data identifying a replacement for the RFID tagged item.

14. A programmable logic controller (PLC) that employs the system of claim 1.

15. A method of managing item inventory, comprising:
receiving RFID tagged items;
reading data from the RFID tagged items;
tracking real-time usage of the RFID tagged items during an assembly operation;
employing at least one of probabilistic or statistical analysis to infer an inventory requirement of the RFID tagged items based upon the tracked real-time usage;
determining an optimal inventory limit to generate an inventory replenishment request for the RFID tagged items based upon the inferred inventory requirement;
generating a replenishment request when a quantity of the RFID tagged items reaches the optimal inventory limit; and
delivering additional items based on the replenishment request.

16. The method of claim 15, wherein reading data from the RFID tagged items occurs via an RFID reader/writer.

17. The method of claim 15, further comprising generating a manifest for each of a plurality of assembled products, wherein the manifest includes a unique data identifying each RFID tagged item installation in the assembled product associated with the manifest.

18. The method of claim 15, updating the manifest upon a RFID tagged item being replaced in the assembled product associated with the manifest, wherein the update includes unique data identifying a replacement for the RFID tagged item.

19. A system that verifies correctness of RFID tagged parts in a multipart product, comprising:
a feeder component that removes an RFID tagged part from a plurality of RFID tagged parts;
an RFID reader component that senses electronic data of the RFID tagged part; and
a verification component that determines the correctness of the RFID tagged part during assembly of a multipart product based at least in part on the electronic data, wherein the RFID tagged part is determined to be correct when the RFID tagged part is at least one of a required part or a proper part among a set of options, the verification component allows the RFID tagged part to be employed during assembly of the multipart product when the RFID part is determined to be correct;
a removal component that removes the RFID tagged part when the RFID tagged part is not determined to be correct.

20. The system of claim 19, the electronic data contains information associated with at least one of a part identification, a part identification number, part type, date of part manufacture, part cost, part supplier information, part color, or part composition.

21. The system of claim 19, the verification component further determines completeness of the multipart product upon completion of assembly of the multipart product by sensing electronic data of all RFID tagged parts in the multipart assembly.

22. The system of claim 19, further comprising a tracking component that generates a manifest for the multipart product, wherein the manifest includes a unique identifier for each RFID tagged part assembled into the multipart product, wherein the unique identifier is included in the sensed electronic data.

23. A method of verifying correctness of RFID tagged parts in a multipart product, comprising:
receiving a plurality of the RFID tagged parts proximate an assembly area;
monitoring the plurality of RFID tagged parts with an RFID reader;
selecting an RFID tagged part from the plurality of RFID tagged parts for an assembly operation of a multipart product;
checking the selected RFID tagged part with the RFID reader for correctness as a part of the multipart product, wherein the RFID tagged part is determined to be correct when the RFID tagged part is at least one of a required part or a proper part among a set of options;
employing the RFID tagged part during the assembly operation of the multipart product when the RFID part is determined to be correct; and
removing the RFID tagged part from the assembly operation when the RFID tagged part is not correct.

24. A system that monitors final product completeness, comprising:
a completely assembled product that is composed of one or more RFID tagged parts;
an RFID reader that checks the completely assembled product for a correct set of parts by sensing electronic data from the one or more RFID tagged parts, the sensed data includes a unique identifier for each of the one or more RFID tagged parts;
a manifest generating component that generates a manifest of the one or more RFID tagged parts for the completely assembled product, wherein the manifest includes a unique identifier for each of the one or more RFID tagged parts assembled into the completely assembled product; and an archiving component that stores the manifest.

25. A method of monitoring completeness of a final product, comprising:

assembling a completely assembled product using one or more RFID tagged parts;

checking the completely assembled product by reading stored electronic information from the one or more RFID tagged parts;

generating a manifest for the completely assembled product, wherein the manifest includes a unique identifier for each of the one or more RFID tagged parts assembled into the completely assembled product; and storing the manifest.

26. The system of claim 25, wherein the manifest is stored temporarily in a PLC, and thereafter transmitted to a remote database.

27. A system that facilitates processing of a warranty and repair procedure, comprising:

a returned product composed of one or more RFID tagged parts;

an archive component that stores an as-built composition of the returned product, wherein the as-built composition includes information identifying RFID tagged parts that were originally assembled into the returned product;

an RFID component that determines an as-returned composition of the returned product by sensing data from the one or more RFID tagged parts of the returned product; and a comparison component that compares the as-returned composition with the as-built composition to determine whether the as-returned composition matches the as-built composition.

28. The system of claim 27, the archive component further updates the as-built composition to indicate one or more replacement RFID tagged parts used in authorized modifications made to the returned product before the returned product was returned.

29. The system of claim 27, the returned product is processed according to a warranty and repair policy based upon the determination whether the as-returned composition matches the as-built composition.

30. A method of processing a warranty and repair procedure, comprising:

receiving a returned product composed of one or more RFID tagged parts;

using an RFID reader to determine an as-returned composition of the returned product by sensing data from the one or more RFID tagged parts of the returned product;

determining whether the as-returned composition matches an as-built composition, wherein the as-built composition includes at least one of:

information identifying RFID tagged parts that were part of an original assembly of the returned product when the returned product was manufactured, or information identifying RFID tagged parts that were part of the original assembly of the returned product when the returned product was manufactured along with information identifying one or more replacement RFID tagged parts used in an authorized modification made to the returned product prior to the returned product being returned;

returning the product if repair is unauthorized under a warranty and repair procedure based upon the determination; and repairing the product if repair is authorized under the warranty and repair procedure based upon the determination.

31. The method of claim 30, further comprising:

determining damaged or defective RFID tagged parts of the returned product;

providing a replacement RFID tagged part;

scanning the replacement RFID tagged part;

checking the replacement RFID tagged part for correctness;

replacing the damaged or defective RFID tagged parts of the returned product with the replacement RFID tagged part to produce a repaired product;

updating the as-built composition to reflect the replacement RFID tagged part;

shipping the repaired product the consumer; and storing the updated as-built composition.

32. A system that facilitates processing of a warranty and repair policy, comprising:

means for receiving a returned product purchased under the warranty and repair policy and composed of RFID tags associated with one or more parts;

means for reading the RFID tags of the one or more parts to determine an as-returned composition of the product by scanning the product upon return to read the one or more RFID tags associated therewith;

means for determining whether the as-returned composition matches a manifest, wherein the manifest includes at least one of:

information identifying RFID tagged parts that were part of an original assembly of the returned product when the returned product was manufactured, or information identifying RFID tagged parts that were part of the original assembly of the returned product when the returned product was manufactured along with information identifying one or more replacement RFID tagged parts used in an authorized modification made to the returned product prior to the returned product being returned; and means for processing the product based upon the determination by one of returning the product if repair is unauthorized under the warranty and repair policy and replacing the one or more parts of the product if repair is authorized under the warranty and repair policy.

* * * * *